United States Patent
Matsunaga et al.

(10) Patent No.: US 11,447,155 B2
(45) Date of Patent: Sep. 20, 2022

(54) VEHICLE CONTROL DEVICE, MAP INFORMATION MANAGEMENT SYSTEM, VEHICLE CONTROL METHOD, AND STORAGE MEDIUM

(71) Applicant: HONDA MOTOR CO., LTD., Tokyo (JP)

(72) Inventors: Hideki Matsunaga, Wako (JP); Tokitomo Ariyoshi, Wako (JP); Umiaki Matsubara, Wako (JP); Masamitsu Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 52 days.

(21) Appl. No.: 17/022,135

(22) Filed: Sep. 16, 2020

(65) Prior Publication Data
US 2021/0086797 A1    Mar. 25, 2021

(30) Foreign Application Priority Data

Sep. 20, 2019  (JP) .............................. JP2019-172018

(51) Int. Cl.
| | | |
|---|---|---|
| *G05D 1/02* | (2020.01) | |
| *B60W 60/00* | (2020.01) | |
| *G01C 21/00* | (2006.01) | |
| *G06F 16/29* | (2019.01) | |
| *G06F 16/23* | (2019.01) | |

(52) U.S. Cl.
CPC ....... *B60W 60/0053* (2020.02); *G01C 21/387* (2020.08); *G01C 21/3807* (2020.08); *G01C 21/3841* (2020.08); *G01C 21/3889* (2020.08); *G06F 16/2379* (2019.01); *G06F 16/29* (2019.01); *B60W 2555/00* (2020.02)

(58) Field of Classification Search
CPC ........... B60W 60/0053; B60W 2555/00; G06F 16/2379; G06F 16/29; G01C 21/3841; G01C 21/3889; G01C 21/387; G01C 21/3807
See application file for complete search history.

(56) References Cited

FOREIGN PATENT DOCUMENTS

| | | | |
|---|---|---|---|
| EP | 1380813 B1 * | 5/2012 | ......... G01C 21/3617 |
| JP | 2002-032773 | 1/2002 | |
| JP | 2014-081947 | 5/2014 | |

(Continued)

OTHER PUBLICATIONS

Japanese Office Action for Japanese Patent Application No. 2019-172018 dated May 31, 2022.

*Primary Examiner* — Vivek D Koppikar
*Assistant Examiner* — Jeffrey R Chalhoub
(74) *Attorney, Agent, or Firm* — Amin, Turocy & Watson, LLP

(57) ABSTRACT

Provided herein is a vehicle control device that includes a recognition unit that recognizes a surrounding status of a vehicle and a driving control unit that controls a speed and/or a steering of the vehicle. The driving control unit performs switching to a second driving state in which a driver has a higher degree of a monitoring obligation than in a first driving state. The vehicle control device further includes a map updating unit that updates intrinsic map information on the basis of the recognition result and when switching from the first driving state to the second driving state is performed by the driving control unit.

8 Claims, 17 Drawing Sheets

(56) References Cited

FOREIGN PATENT DOCUMENTS

| | | | |
|---|---|---|---|
| JP | 2017-090548 | 5/2017 | |
| JP | 2017-151041 | 8/2017 | |
| JP | 2019-095285 | 6/2019 | |
| JP | 2019-095286 | 6/2019 | |
| WO | WO-2017179151 A1 * | 10/2017 | ............ B60W 10/04 |

* cited by examiner

FIG. 4

| MAP INFORMATION | TIME RESISTANCE | ATTRIBUTES OF INCLUDED INFORMATION | EFFECTIVE PERIOD SETTING |
| --- | --- | --- | --- |
| FIRST SURROUNDING ENVIRONMENT INFORMATION (FIRST LAYER INFORMATION) | HIGH | PARTITION LINE, SIGNAL, TRAFFIC SIGN··· | NO |
| SECOND SURROUNDING ENVIRONMENT INFORMATION (SECOND LAYER INFORMATION) | LOW (TEMPORARY CHANGE INFORMATION) | LANE CLOSURE ACCOMPANYING CONSTRUCTION, PASSAGE BLOCKING ACCORDING TO ACCIDENT··· | YES |
| SECOND SURROUNDING ENVIRONMENT INFORMATION (THIRD LAYER INFORMATION) | EXTREMELY LOW (TRANSIENT INFORMATION) | INSPECTION, PASSAGE BLOCKING ACCORDING TO EVENT··· | YES (SHORT EFFECTIVE PERIOD) |

FIG. 5
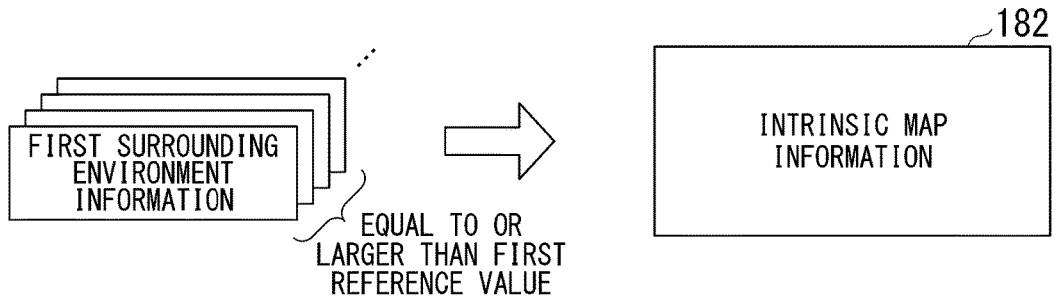
FIG. 6
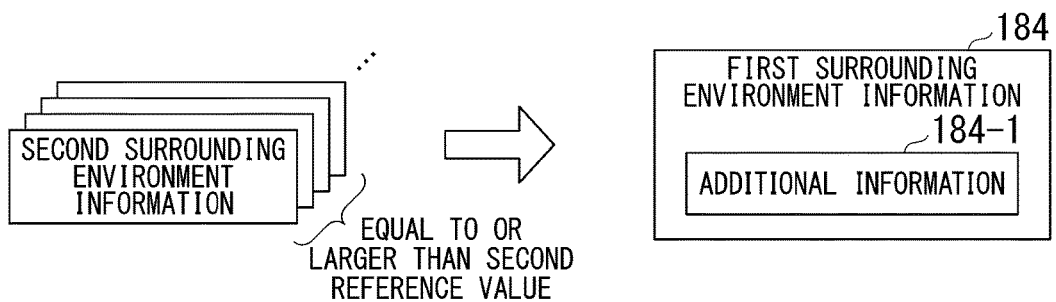
FIG. 7
| DRIVING STATE | SECOND MAP INFORMATION | INTRINSIC MAP INFORMATION | FIRST SURROUNDING ENVIRONMENT INFORMATION |
|---|---|---|---|
| FIRST DRIVING STATE | PRESENT | - | - |
|  | ABSENT | PRESENT | - |
|  | ABSENT | ABSENT | EQUAL TO OR LARGER THAN FIRST REFERENCE VALUE |
| SECOND DRIVING STATE | ABSENT | ABSENT | SMALLER THAN FIRST REFERENCE VALUE |

VEHICLE CONTROL DEVICE, MAP INFORMATION MANAGEMENT SYSTEM, VEHICLE CONTROL METHOD, AND STORAGE MEDIUM

CROSS-REFERENCE TO RELATED APPLICATION

Priority is claimed on Japanese Patent Application No. 2019-172018, filed Sep. 20, 2019, the content of which is incorporated herein by reference.

BACKGROUND OF THE INVENTION

Field of the Invention

The present invention relates to a vehicle control device, a map information management system, a vehicle control method, and a storage medium.

Description of Related Art

Conventionally, technologies for selecting a road for which the amount of traffic of vehicles executing automated driving is larger as a recommended path on the basis of information relating to execution/non-execution of automated driving, particularly, information relating to amounts of traffic of vehicles executing automated driving, have been disclosed (for example, Japanese Unexamined Patent Application, First Publication No. 2017-151041). Technologies for aggregating information of positions and the like, which represents positions at which danger reactions that occur when drivers of vehicles sense danger during driving are detected, in a server apparatus and distributing the aggregated information to other vehicles as attention information are known (for example, Japanese Unexamined Patent Application, First Publication No. 2014-81947).

SUMMARY OF THE INVENTION

However, in the conventional technologies, events that serve as triggers for updating map information have not been sufficiently reviewed.

Aspects of the present invention are in view of such situations, and one object thereof is to provide a vehicle control device, a map information management system, a vehicle control method, and a storage medium capable of updating map information at better update timings.

In order to achieve related objects by solving the problems described above, the present invention employs the following aspects.

(1): According to one aspect of the present invention, there is provided a vehicle control device including: a recognition unit configured to recognize a surrounding status of a vehicle; and a driving control unit configured to control one or both of a speed and steering of the vehicle, the driving control unit performing switching to a second driving state in which a driver has a higher degree of a monitoring obligation than in a first driving state in a case in which the vehicle is caused to travel in the first driving state in which the driver has a lower degree of the monitoring obligation among driving states of a plurality of types, and a recognition result acquired by the recognition unit satisfies a predetermined condition relating to the driving state, the vehicle control device further including a map updating unit configured to update intrinsic map information on the basis of the recognition result acquired by the recognition unit in a case in which switching from the first driving state to the second driving state is performed by the driving control unit.

(2): The aspect (1) described above further includes a communication unit configured to communicate with a map updating server updating a shared map on the basis of information acquired from the vehicle, and the map updating unit may transmit the recognition result acquired by the recognition unit at the time of switching from the first driving state to the second driving state using the driving control unit to the map updating server using the communication unit.

(3): In the aspect (2) described above, the map updating unit may reflect the recognition result acquired by the recognition unit from a predetermined time before a time point at which switching from the first driving state to the second driving state is performed by the driving control unit in the intrinsic map information.

(4): In the aspect (2) or (3) described above, the map updating unit may store a traveling locus of the vehicle in the second driving state in a memory, and in a case in which a state satisfying the predetermined condition relating to the driving state is resolved, set a point of interest on the basis of the traveling locus of the vehicle stored in the memory, and update the intrinsic map information corresponding to the point of interest.

(5): In the aspect (4) described above, first layer information and second layer information having a higher degree of change according to elapse of time than the first layer information are included in the intrinsic map information, and the map updating unit may perform a process for updating the intrinsic map information on the basis of the first layer information in a case in which a value representing a degree of accumulation of the first layer information relating to the point of interest is equal to or larger than a first reference value and perform a process of updating the intrinsic map information on the basis of the second layer information relating to the point of interest in a case in which a value representing a degree of accumulation of the second layer information relating to the point of interest becomes equal to or larger than a second reference value that is smaller than the first reference value.

(6): In the aspect (5) described above, the map updating unit may delete information of the second layer information for which a predetermined period has elapsed from a time point of assignment in the second layer information assigned to the intrinsic map information and not delete the first layer information in accordance with the predetermined period.

(7): In the aspect (5) or (6) described above, the recognition unit may also assign attribute information that can be used for identifying attributes of the second layer information to the intrinsic map information and determine the second reference value in accordance with the attribute information.

(8): In any one of the aspects (5) to (7) described above, the map updating unit may transmit the first layer information relating to the point of interest to the map updating server using the communication unit in a case in which a value representing a degree of accumulation of the first layer information relating to the point of interest becomes equal to or larger than a third reference value that is equal to or larger than the first reference value and transmit the second layer information relating to the point of interest to the map updating server using the communication unit in a case in which a value representing a degree of accumulation of the second layer information relating to the point of interest becomes equal to or larger than a fourth reference value that is equal to or larger than the second reference value.

(9): In the aspect (8) described above, the map updating unit may request other vehicles having other intrinsic map information or the map updating server using the communication unit to disclose other intrinsic map information corresponding to insufficient intrinsic map information in a case in which downloaded shared map information and the intrinsic map information are insufficient for a point at which the vehicle is present.

(10): According to one aspect of the present invention, there is provided a map information management system including any one of the aspects (2) to (9) described above; and the map updating server configured to update a shared map on the basis of information acquired from a vehicle.

(11) According to one aspect of the present invention, there is provided a vehicle control method using a computer, the vehicle control method including: recognizing a surrounding status of a vehicle; controlling one or both of a speed and steering of the vehicle; performing switching to a second driving state in which a driver has a higher degree of a monitoring obligation than in a first driving state in a case in which the vehicle is caused to travel in the first driving state in which the driver has a lower degree of the monitoring obligation among driving states of a plurality of types, and a recognition result satisfies a predetermined condition relating to the driving state; and updating intrinsic map information on the basis of the recognition result in a case in which switching from the first driving state to the second driving state is performed.

(12): According to one aspect of the present invention, there is provided a computer-readable non-transitory storage medium storing a vehicle control program causing a computer to execute: recognizing a surrounding status of a vehicle; controlling one or both of a speed and steering of the vehicle; performing switching to a second driving state in which a driver has a higher degree of a monitoring obligation than in a first driving state in a case in which the vehicle is caused to travel in the first driving state in which the driver has a lower degree of the monitoring obligation among driving states of a plurality of types, and a recognition result satisfies a predetermined condition relating to the driving state; and updating intrinsic map information on the basis of the recognition result in a case in which switching from the first driving state to the second driving state is performed.

According to the aspects (1) to (12) described above, map information can be updated at better update timings.

According to the aspect (10) described above, map information updated at better timings can be distributed to vehicles.

BRIEF DESCRIPTION OF THE DRAWINGS

FIG. 4 is a diagram illustrating an example of recognition targets for a first surrounding environment recognizing unit and a second surrounding environment recognizing unit;

FIG. 5 is a diagram illustrating intrinsic map information;

FIG. 6 is a diagram illustrating first surrounding environment information and second surrounding environment information;

FIG. 7 is a diagram illustrating driving states that can be performed by a vehicle control device and map information;

DETAILED DESCRIPTION OF THE INVENTION

Hereinafter, a vehicle control device, a map information management system, a vehicle control method, and a storage medium according to embodiments of the present invention will be described with reference to the drawings.

A first driving state and a second driving state according to embodiments described below, for example, are assumed to be in correspondence with the following patterns.
<Pattern 1>
First driving state: a state in which automated driving is executed (regardless of an automated drive level).
Second driving state: manual driving Automated drive levels, for example, are levels corresponding to degrees of drive control in a system of a vehicle such as a level in which all the driving control in a vehicle is automatedly performed, a level in which driving control of acceleration/deceleration, steering, or the like is automatedly performed, and the like. In a case in which driving states are defined in multi-stages in accordance with conditions such as a surrounding monitoring obligation of a driver, a gripping obligation of an operator, and the like, a driving state may be selected from among a plurality of selectable driving states such as "there are no surrounding monitoring obligation and no gripping obligation (automated drive level: high), "there are a surrounding monitoring obligation and no gripping obligation (automated drive level: intermediate), and "there is a surrounding monitoring obligation, and a gripping obligation is limited (automated drive level: low).

The manual driving may be in a state in which driving support represented by an adaptive cruise control system (ACC), a lane keeping assistance system (LKAS), or the like is executed or in a state in which driving support such as the ACC, the LKAS, or the like is not executed.

<Pattern 2>
First driving state: automated drive (level: high)
Second driving state: automated drive (level: low)

First Embodiment

[Entire Configuration]

Figure 1:
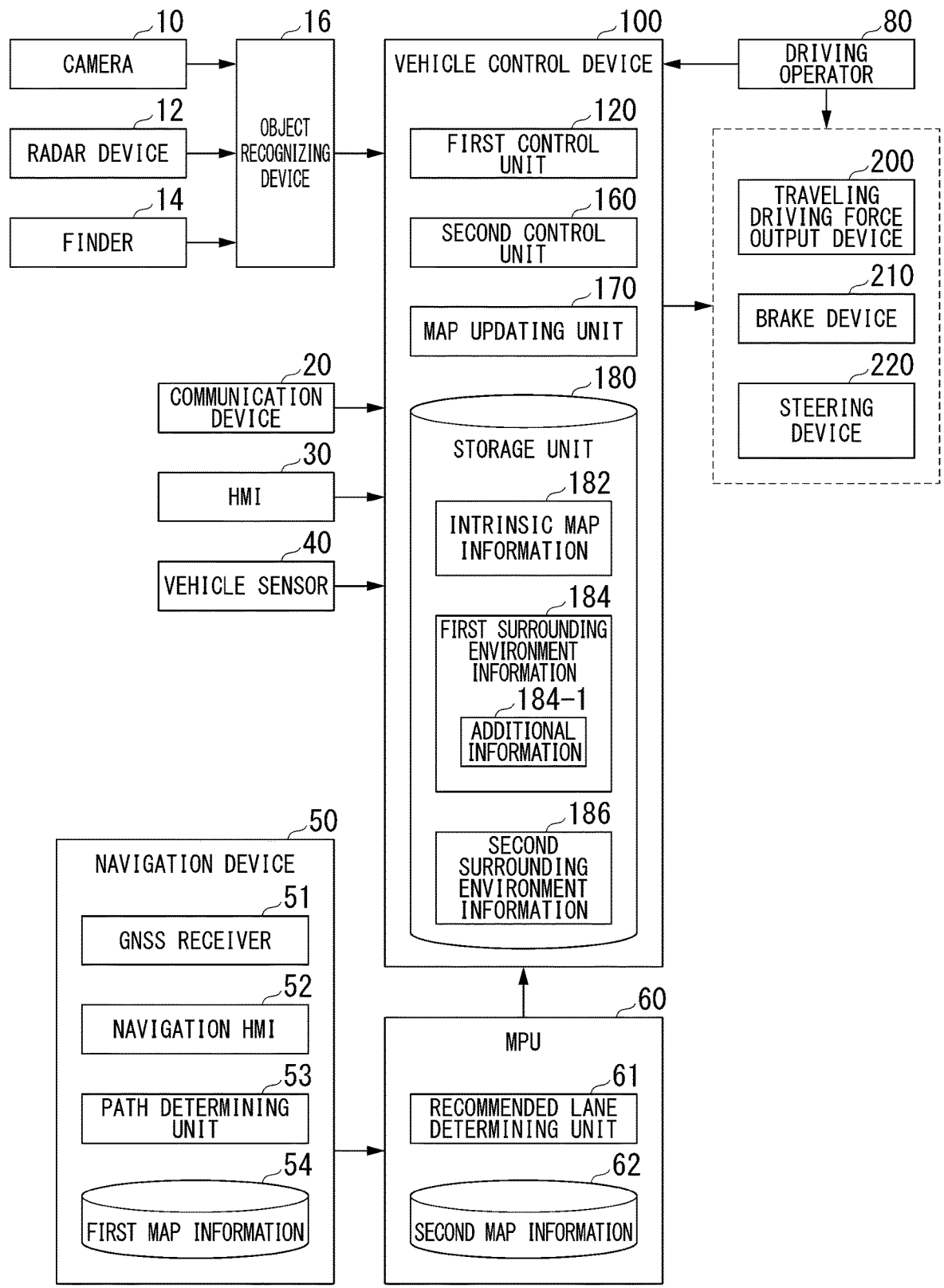
FIG. 1 is a configuration diagram of a vehicle system using a vehicle control device according to a first embodiment.

FIG. 1 is a configuration diagram of a vehicle system 1 using a vehicle control device 100 according to a first embodiment. A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. An electric motor operates using power generated using a power generator connected to an internal combustion engine or discharge power of a secondary cell or a fuel cell.

The vehicle system 1, for example, includes a camera 10, a radar device 12, a finder 14, an object recognizing device 16, a driving operator 80, a vehicle control device 100, a traveling driving force output device 200, a brake device 210, and a steering device 220. Such devices and units are interconnected using a multiplex communication line such as a controller area network (CAN) communication line, a serial communication line, a radio communication network, or the like. The configuration illustrated in FIG. 1 is merely one example, and thus, a part of the configuration may be omitted, and, furthermore, an additional configuration may be added.

The camera 10, for example, is a digital camera using a solid-state imaging device such as a charge coupled device (CCD) or a complementary metal oxide semiconductor (CMOS). The camera 10 is installed at arbitrary places in a vehicle (hereinafter, referred to as a vehicle M) in which the vehicle system 1 is mounted. In a case in which a front side is to be imaged, the camera 10 is installed at an upper part of a front windshield, a rear face of a rear-view mirror, or the like. The camera 10, for example, periodically images the surrounding of the vehicle M repeatedly. The camera 10 may be a stereo camera.

The radar device 12 emits radiowaves such as millimeter waves to the vicinity of the vehicle M and detects at least a position (a distance and an azimuth) of an object by detecting radiowaves (reflected waves) reflected by the object. The radar device 12 is installed at arbitrary places in the vehicle M. The radar device 12 may detect a position and a speed of an object using a frequency modulated continuous wave (FM-CW) system.

The finder 14 is a light detection and ranging (LIDAR). The finder 14 emits light to the vicinity of the vehicle M and measures scattered light. The finder 14 detects a distance to a target on the basis of a time interval from light emission to light reception. The emitted light, for example, is pulse-shaped laser light. The finder 14 is installed at an arbitrary place in the vehicle M.

The object recognizing device 16 performs a sensor fusion process on results of detection using some or all of the camera 10, the radar device 12, and the finder 14, thereby recognizing a position, a type, a speed, and the like of an object. The object recognizing device 16 outputs a result of recognition to the vehicle control device 100. The object recognizing device 16 may output detection results of the camera 10, the radar device 12, and the finder 14 to the vehicle control device 100 as they are. The object recognizing device 16 may be omitted from the vehicle system 1.

The communication device 20, for example, communicates with other vehicles present in the vicinity of an automated driving vehicle using a cellular network, a Wi-Fi network, Bluetooth (registered trademark), dedicated short range communication (DSRC), or the like or communicates with various server apparatuses through a radio base station. The communication device 20 is an example of a "communication unit".

The HMI 30 presents various types of information to a vehicle occupant of the automated driving vehicle and receives an input operation performed by a vehicle occupant. The HMI 30 includes various display devices, a speaker, a buzzer, a touch panel, a switch, a key, and the like.

The vehicle sensor 40 includes a vehicle speed sensor detecting a speed of the automated driving vehicle, an acceleration sensor detecting an acceleration, a yaw rate sensor detecting an angular velocity around a vertical axis, an azimuth sensor detecting a direction of the automated driving vehicle, and the like.

The navigation device 50, for example, includes a GNSS receiver 51, a navigation HMI 52, and a path determining unit 53. The navigation device 50 stores first map information 54 in a storage device such as an HDD or a flash memory. The GNSS receiver 51 identifies a position of the automated driving vehicle on the basis of signals received from GNSS satellites. The position of the automated driving vehicle may be identified or complemented by an inertial navigation system (INS) using an output of the vehicle sensor 40. The navigation HMI 52 includes a display device, a speaker, a touch panel, a key, and the like. The navigation HMI 52 may be configured to be common as a part or the whole of the HMI 30 described above. The path determining unit 53, for example, determines a path (hereinafter, referred to as a path on a map) from a location of the automated driving vehicle identified by the GNSS receiver 51 (or an input arbitrary location) to a destination input by a vehicle occupant using the navigation HMI 52 by referring to the first map information 54. The first map information 54, for example, is information in which a road form is represented by respective links representing roads and respective nodes connected using the links. The first map information 54 may include a curvature of each road, point of interest (POI) information, and the like. The path on the map is output to the MPU 60. The navigation device 50 may perform path guide using the navigation HMI 52 on the basis of the path on the map. The navigation device 50, for example, may be realized using a function of a terminal device such as a smartphone, a tablet terminal, or the like held by the vehicle occupant. The navigation device 50 may transmit a current position and a destination to a navigation server through the communication device 20 and acquire a path equivalent to the path on the map from the navigation server.

The MPU 60, for example, includes a recommended lane determining unit 61 and stores second map information 62 in a storage device such as an HDD or a flash memory. The recommended lane determining unit 61 divides the path on the map provided from the navigation device 50 into a plurality of blocks (for example, divides the path into blocks of 100 [m] in the advancement direction of the vehicle) and determines a recommended lane for each block by referring to the second map information 62. The recommended lane determining unit 61 determines in which of lanes numbered from the left side to travel. In a case in which there is a branching place in the path on the map, the recommended lane determining unit 61 determines a recommended lane such that the automated driving vehicle can travel along a reasonable path for advancement to a branching destination.

The second map information 62 is map information having higher accuracy than the first map information 54. The second map information 62, for example, includes information on the centers of respective lanes or information on boundaries between lanes and the like. In addition, in the second map information 62, road information, traffic regulation information, address information (addresses and postal codes), facility information, telephone number information, and the like may be included. The second map information 62 may be updated as needed by the communication device 20 communicating with another device.

The driving operator 80, for example, includes an acceleration pedal, a brake pedal, a shift lever, a steering wheel, a steering wheel variant, a joystick, and other operators. A sensor detecting the amount of an operation or the presence/absence of an operation is installed in the driving operator 80, and a result of detection thereof is output to the vehicle control device 100 or some of all of the traveling driving force output device 200, the brake device 210, and the steering device 220.

The vehicle control device 100, for example, includes a first control unit 120, a second control unit 160, a map updating unit 170, and a storage unit 180. Each of the first control unit 120, the second control unit 160, and the map updating unit 170, for example, is realized by a hardware processor such as a central processing unit (CPU) executing a program (software). Some or all of these constituent elements may be realized by hardware (a circuit unit; including circuitry) such as a large scale integration (LSI), an application specific integrated circuit (ASIC), a field-programmable gate array (FPGA), or a graphics processing unit (GPU) or may be realized by software and hardware in cooperation. The program may be stored in a storage device (a storage device including a non-transitory storage medium) such as an HDD, a flash memory, or the like of the vehicle control device 100 in advance or may be stored in a storage medium such as a DVD or a CD-ROM that can be loaded or unloaded and installed in the HDD or the flash memory of the vehicle control device 100 by loading the storage medium (a non-transitory storage medium) into a drive device.

The storage unit 180, for example, is realized using a hard disk drive (HDD), a flash memory, an electrically erasable programmable read only memory (EEPROM), a read only memory (ROM), a random access memory (RAM), or the like. In the storage unit 180, for example, intrinsic map information 182, first surrounding environment information 184, second surrounding environment information 186, and other information are stored. The intrinsic map information 182 is map information that is collected in accordance with the vehicle M traveling and is map information with a high accuracy that is the same as that of the second map information. The intrinsic map information 182 may be referred to as an "experience map" or a "user map". The intrinsic map information 182, for example, includes information of centers of lanes or information of boundaries of lanes and the like. The second map information 62 may be occasionally updated by the communication device 20 communicating with another device (for example, a map updating server that collects intrinsic map information). Details of the first surrounding environment information 184 and the second surrounding environment information 186 will be described later.

Figure 2:
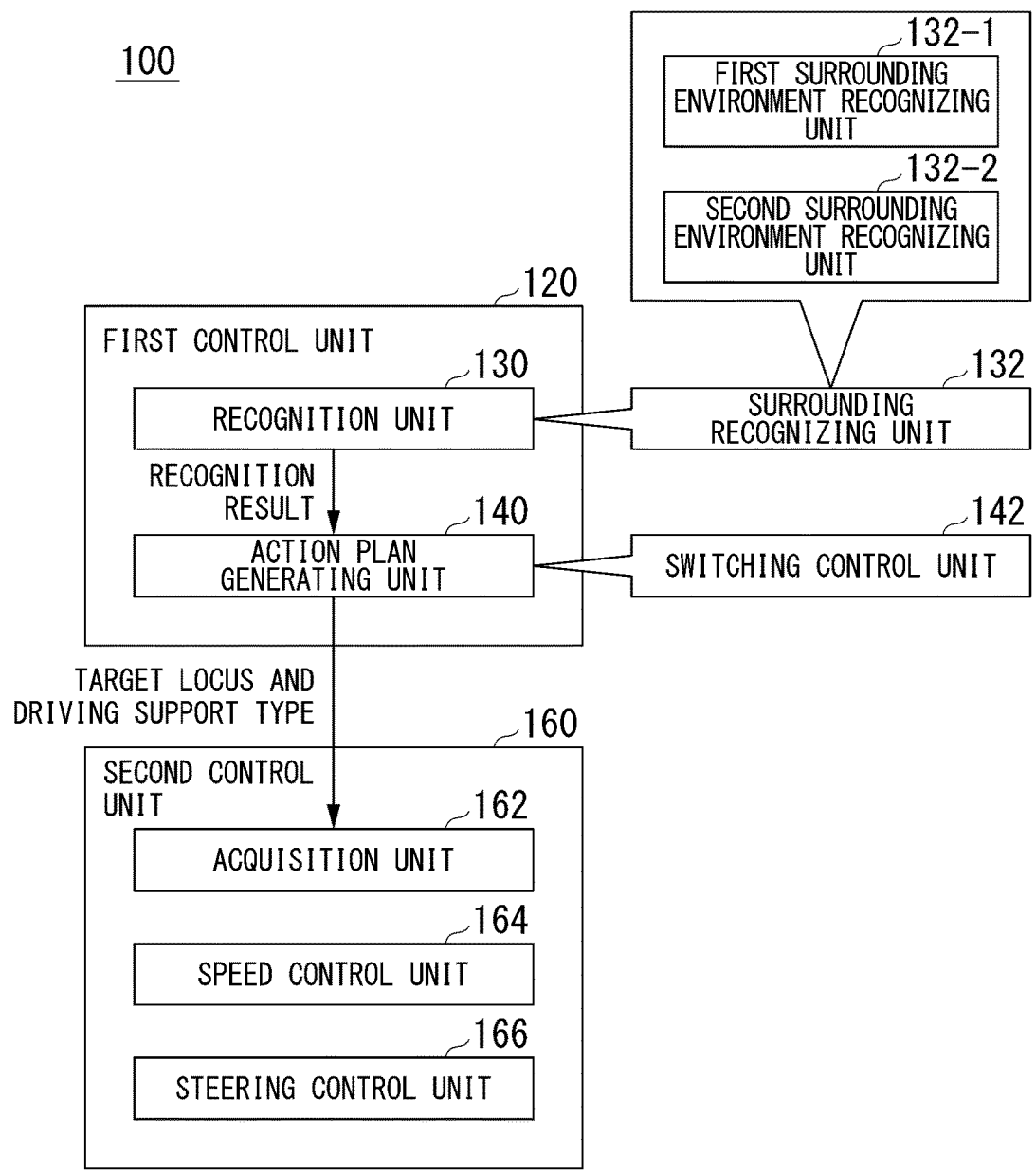
FIG. 2 is a functional configuration diagram of a first control unit and a second control unit.

FIG. 2 is a functional configuration diagram of the first control unit 120 and the second control unit 160. The first control unit 120, for example, includes a recognition unit 130 and an action plan generating unit 140. The first control unit 120, for example, simultaneously realizes functions using artificial intelligence (AI) and functions using a model provided in advance. For example, a function of "recognizing an intersection" may be realized by executing recognition of an intersection using deep learning or the like and recognition based on conditions given in advance (there are a signal, a road marking, and the like that can be used for pattern matching) at the same time and comprehensively evaluating both recognitions by assigning scores to them. Accordingly, the reliability of automated driving is secured.

The recognition unit 130 recognizes the surrounding of the vehicle M and estimates behaviors of recognized target objects. The recognition unit 130, for example, includes a surrounding recognizing unit 132.

The surrounding recognizing unit 132 recognizes states such as positions, speeds, and accelerations of objects (a preceding vehicle, an oncoming vehicle, and the like) present in the vicinity of the automated driving vehicle on the basis of information input from the camera 10, the radar device 12, and the finder 14 through the object recognizing device 16. A position of an object, for example, is recognized as a position on absolute coordinates using a reference point (a center of gravity, a drive axis center, or the like) of the automated driving vehicle as its origin and is used for control. The position of the object may be represented as a reference point such as a center of gravity, a corner, or the like of the object or may be represented in an expressed area. A "state" of an object may include an acceleration and a jerk or a "behavior state" of the object (for example, whether or not a preceding vehicle of the vehicle M is changing lanes or is about to change lanes).

When recognizing a traveling lane, the surrounding recognizing unit 132 recognizes a position and a posture of the automated driving vehicle with respect to the traveling lane. The surrounding recognizing unit 132, for example, may recognize a deviation of a representative point of the automated driving vehicle from the center of the lane and an angle formed with respect to a line in which the center of the lane in the advancement direction of the automated driving vehicle is aligned as a relative position and a posture of the automated driving vehicle with respect to the traveling lane. Instead of this, the surrounding recognizing unit 132 may recognize the position of the representative point of the automated driving vehicle with respect to one side end part (a road partition line or a road boundary) of the traveling lane or the like as a relative position of the automated driving vehicle with respect to the traveling lane.

For example, the surrounding recognizing unit 132 recognizes a lane in which the automated driving vehicle is traveling (traveling lane). For example, the surrounding recognizing unit 132 recognizes a traveling lane by comparing a pattern of road partition lines (for example, an arrangement of solid lines and broken lines) acquired from the second map information 62 with a pattern of road partition lines in the vicinity of the automated driving vehicle recognized from an image captured by the camera 10. The surrounding recognizing unit 132 may recognize a traveling lane by recognizing traveling road boundaries (road boundaries) including road partition lines, road shoulders, curbstones, a median strip, guard rails, and the like instead of road partition lines. In this recognition, the location of the automated driving vehicle acquired from the navigation device 50 or a processing result acquired by the INS may be taken into account as well. The surrounding recognizing unit 132 recognizes a temporary stop line, a signal, and other road events.

The surrounding recognizing unit 132 recognizes information relating to a roadway on which a surrounding vehicle, particularly, the vehicle M will travel on the basis of surrounding vehicles of the vehicle M recognized from an image captured by the camera 10, the image captured by the camera 10, traffic congestion information of the vicinity of the vehicle M acquired by the navigation device 50 or position information acquired from the second map information 62. The information relating to roadways on which vehicles will travel, for example, includes a width of a lane (a roadway width) in which the vehicle M will travel.

The surrounding recognizing unit 132, for example, includes a first surrounding environment recognizing unit 132-1 and a second surrounding environment recognizing unit 132-2.

The first surrounding environment recognizing unit 132-1, for example, recognizes a surrounding environment such that the intrinsic map information 182 can be generated in an area for which there is no the second map information 62. The first surrounding environment recognizing unit 132-1, for example, recognizes a traveling lane by comparing patterns of road partition lines in the vicinity of the automated driving vehicle recognized from the first map information 54 and the image captured by the camera 10 with each other. The first surrounding environment recognizing unit 132-1 may recognize a traveling lane by recognizing traveling road boundaries (road boundaries) including road partition lines, road shoulders, curbstones, a median strip, guard rails, and the like instead of the road partition lines. The first surrounding environment recognizing unit 132-1 recognizes a temporary stop line, a signal, and other road events having high time resistance (it is difficult for such events to change even when the time elapses).

The first surrounding environment recognizing unit 132-1 recognizes information relating to a roadway on which a surrounding vehicle, particularly, the vehicle M will travel on the basis of surrounding vehicles of the vehicle M that are recognized from an image captured by the camera 10, the image captured by the camera 10, and traffic congestion information of the vicinity of the vehicle M acquired by the navigation device 50. The information relating to a roadway on which a vehicle will travel, for example, includes a width of a lane (a roadway width) in which the vehicle M will travel. The first surrounding environment recognizing unit 132-1 outputs some or all of recognition results to first surrounding environment information 184 of the storage unit 180 and stores the recognition results therein. The recognition results acquired by the first surrounding environment recognizing unit 132-1 may be temporarily stored for a predetermined storage time (for example, about 5 [min]), and a part or the whole of the temporary storage may be output to the storage unit 180. Alternatively, only in a case in which a recognition result different from the first surrounding environment information 184 is acquired, the recognition result may be output to the storage unit 180.

The second surrounding environment recognizing unit 132-2, for example, recognizes a road event having low time resistance (having a high possibility of the event changing when the time elapses) in a lane in which the automated driving vehicle is traveling. The second surrounding environment recognizing unit 132-2, for example, recognizes a road cone, a pole, a passage blocking fence representing a blockade of a lane accompanying a traffic accident or construction. The second surrounding environment recognizing unit 132-2 may recognize a standing signboard in which a closing time, a detour direction, or the like representing a state in which traveling in a lane in accordance with a rule or a route different from that of a normal time such as in the case of an inspection or a sport event, or the like is necessary is described. The second surrounding environment recognizing unit 132-2 outputs a result of the recognition to the second surrounding environment information 186 of the storage unit 180 and stores the result therein.

The action plan generating unit 140 basically travels in a recommended lane determined by the recommended lane determining unit 61 and generates a target locus along which the vehicle M will travel in the future such that automated driving corresponding to a surrounding status of the vehicle M is executed. The target locus, for example, includes a speed element. For example, the target locus is represented as a sequence of places (locus points) at which the vehicle M will arrive. A locus point is a place at which the vehicle M will arrive at respective predetermined traveling distances (for example, about every several [m]) as distances along the road, and separately from that, a target speed and a target acceleration for each of predetermined sampling times (for example, about a fraction of a [sec]) are generated as a part of the target locus.

The action plan generating unit 140, in an area for which the second map information 62 is not present, causes the recommended lane determining unit 61 to determine a recommended lane using information corresponding to high-accuracy map information stored in the intrinsic map information 182 of the storage unit 180 and generates a target locus along which the vehicle M will travel in the future such that the vehicle M will travel in the recommended lane and execute automated driving corresponding to a surrounding status of the vehicle M. The action plan generating unit 140 is one example of "locus generating unit".

The action plan generating unit 140, for example, includes a switching control unit 142. The switching control unit 142 selects and executes one of driving states of a plurality of types that can be performed by the vehicle M.

In the following description, a first driving state among driving states will be described to be executable when the second map information 62 or the intrinsic map information 182 is present.

For example, the navigation HMI 52 of the navigation device 50 accepts an input of information of a destination when a vehicle occupant such as a driver of the vehicle M gets in. The navigation device 50 determines a path (a target locus) on the map from the current location of the vehicle M to the destination. This path on the map is stored in the navigation device 50 until the vehicle M arrives at the destination. At this time, the action plan generating unit 140 may select a driving state to be executed on a path in advance. The action plan generating unit 140 may occasionally select a preferable driving state on the basis of a result of recognition of an image captured by the camera 10 or the like during traveling using the surrounding recognizing unit 132.

The second control unit 160 controls the traveling driving force output device 200, the brake device 210, and the steering device 220 such that the automated driving vehicle passes through a target locus generated by the action plan generating unit 140 at a scheduled time. A combination of the action plan generating unit 140 and the second control unit 160 is one example of "driving control unit".

Referring back to FIG. 1, the second control unit 160, for example, includes an acquisition unit 162, a speed control unit 164, and a steering control unit 166. The acquisition unit 162 acquires information of a target locus (locus points) generated by the action plan generating unit 140 and stores the acquired target locus in a memory (not illustrated). The speed control unit 164 controls the traveling driving force output device 200 or the brake device 210 on the basis of speed elements accompanying the target locus stored in the memory. The steering control unit 166 controls the steering device 220 in accordance with a bending state of the target locus stored in the memory. The processes of the speed control unit 164 and the steering control unit 166, for example, are realized by a combination of feed-forward control and feedback control. As one example, the steering control unit 166 executes feed-forward control according to a curvature of a road disposed in front of the automated driving vehicle and feedback control based on a deviation from a target locus in combination.

In a case in which a value representing a degree of accumulation of the first surrounding environment information 184 of a recognition result acquired by the first surrounding environment recognizing unit 132-1 becomes equal to or larger than a first reference value, the map updating unit 170 generates intrinsic map information 182 on the basis of the accumulated first surrounding environment information 184. In this way, in the intrinsic map information 182, new map information that is absent in the second map information 62 is generated, or map information is updated. In a case in which a value representing a degree of accumulation of the second surrounding environment information 186 of a recognition result acquired by the second surrounding environment recognizing unit 132-2 becomes equal to or larger than a second reference value, the map updating unit 170 updates additional information 184-1 associated with the first surrounding environment information 184 on the basis of the accumulated second surrounding environment information 186. The additional information 184-1 will be described later.

The traveling driving force output device 200 outputs a traveling driving force (torque) for enabling the vehicle to travel to driving wheels. The traveling driving force output device 200, for example, includes a combination of an internal combustion engine, an electric motor, and a transmission, and an ECU controlling these. The ECU controls the components described above in accordance with information input from the second control unit 160 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second control unit 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure in the master cylinder to a cylinder by controlling an actuator in accordance with information input from the second control unit 160.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the second control unit 160 or information input from the driving operator 80.

Figure 3:
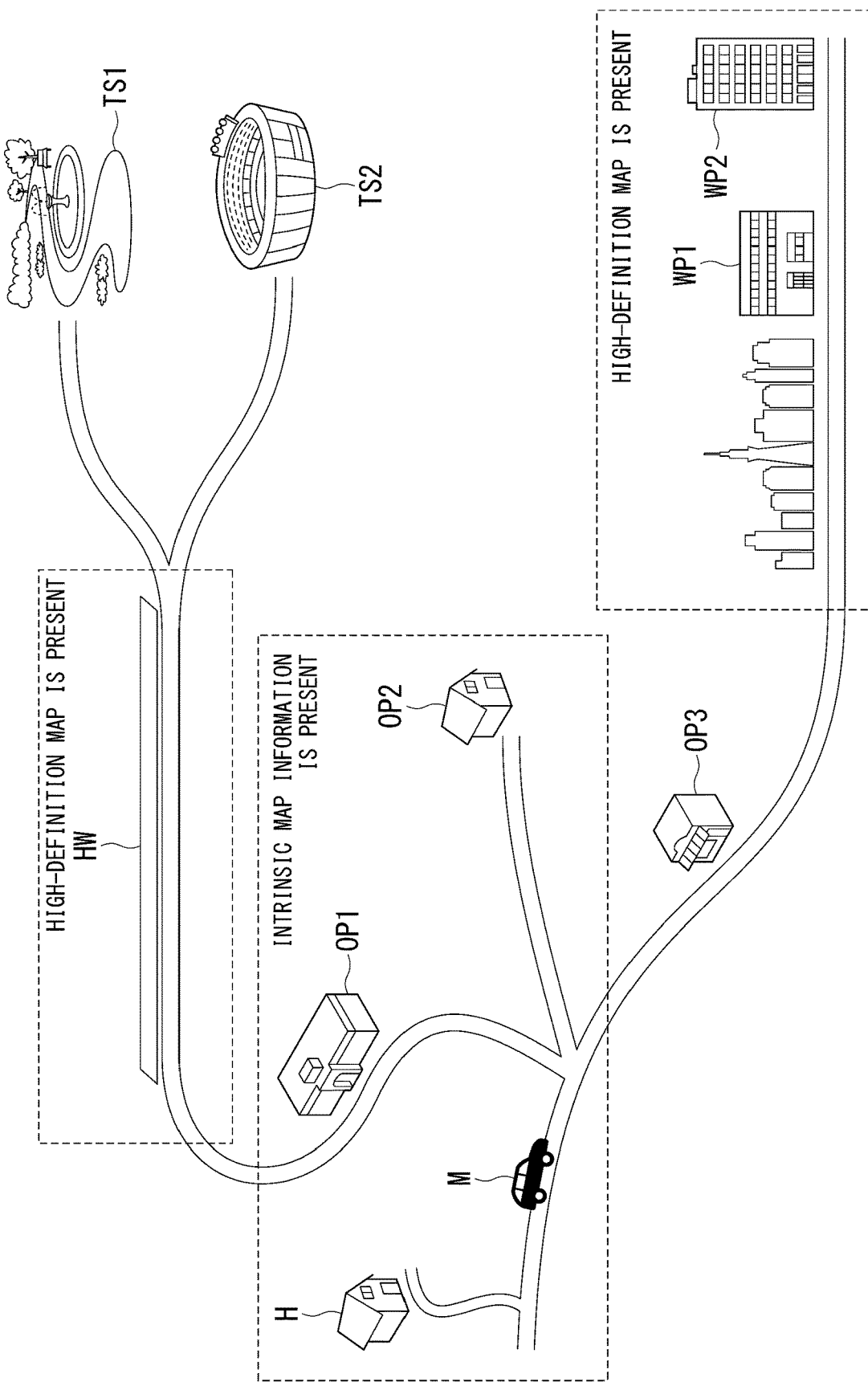
FIG. 3 is a diagram illustrating a traveling environment of a vehicle.

FIG. 3 is a diagram illustrating a traveling environment of a vehicle M. In a case in which an office WP1 or an office WP2 present inside an area for which the second map information 62 is present is the destination or in the case of traveling on a highway HW, the second control unit 160 of the vehicle M can travel by executing the first driving state in which the driver has a low monitoring obligation among driving support of a plurality of types.

On the other hand, in a case in which a place located in the vicinity of one's house H present in an area for which the second map information 62 is absent or a destination OP1 or a destination OP2 (for example, a supermarket, a hospital, a house of a friend/relative, or the like), which is present inside an area for which the second map information 62 is absent, that is regularly visited is a destination, when the intrinsic map information 182 is present, the second control unit 160 can execute the first driving state in which the driver has a low monitoring obligation using the intrinsic map information 182.

In a case in which a destination OP3 present in an area for which the second map information 62 is absent is regularly visited, the vehicle control device 100 of the vehicle M generates intrinsic map information 182 such that traveling can be performed by executing the first driving state.

In a case in which a tour site TS1 or a tour site TS2 in an area for which the second map information 62 is absent and for which the intrinsic map information 182 is absent is a destination, the second control unit 160 executes a second driving state in which the driver has a higher monitoring obligation than in the first driving state.

FIG. 4 is a diagram illustrating an example of recognition targets for the first surrounding environment recognizing unit 132-1 and the second surrounding environment recognizing unit 132-2. For example, the first surrounding environment recognizing unit 132-1 recognizes road events having high time resistance corresponding to a partition line, a temporary stop line, a signal, a traffic sign, and the like. An effective period is not set for information stored in the first surrounding environment information 184 that is a recognition result recognized by the first surrounding environment recognizing unit 132-1. The information stored in the first surrounding environment information 184 is one example of "first layer information."

The second surrounding environment recognizing unit 132-2 recognizes road events recognized in a traveling lane while the vehicle M is traveling through automated driving and having low time resistance, which are not recognition targets for the first surrounding environment recognizing unit 132-1. For example, when a predetermined road cone is recognized, the second surrounding environment recognizing unit 132-2 recognizes that a lane has been closed for construction. For example, when a predetermined passage blocking fence is recognized, the second surrounding environment recognizing unit 132-2 recognizes that passage blocking accompanying a traffic accident is performed. There is a high possibility that the passage blocking accompanying a traffic accident and the lane closure for construction described above will be resolved in about several months at the longest. For this reason, an effective period is set to the information stored in the second surrounding environment information 186 that is a recognition result recognized by the second surrounding environment recognizing unit 132-2. A recognition result of a road event of attribute information, which can be used for identifying attributes of construction, a traffic accident, and the like, stored in the second surrounding environment information 186 together with the recognition result is one example of "second layer information."

There is a possibility of the second surrounding environment recognizing unit 132-2 recognizing road events having extremely low time resistance that are resolved in about several hours to several days such as passage blocking accompanying an inspection or a sporting event, a vehicle that is stopped on a road shoulder, and the like. Such a recognition results may be handled similarly to the result of recognition of construction or a traffic accident described above or may be handled as information of a level different from that of the result of recognition of construction or a traffic accident. In the following description, a road event of attribute information having extremely low time resistance may be referred to as "third layer information." In a case in which road events having low time resistance are divided in accordance with time resistance, for example, an effective period of the second layer information is set to about one month, and an effective period of the third layer information is set to about one week.

FIG. 5 is a diagram illustrating the intrinsic map information 182. When the first surrounding environment information 184 of the recognition result acquired by the first surrounding environment recognizing unit 132-1 relating to a point of interest is accumulated up to the first reference value or more, the map updating unit 170 generates or updates the intrinsic map information 182 on the basis of the accumulated first surrounding environment information 184. A point of interest, for example, may be defined using address information or may be defined using an arbitrary map grid. The first reference value, for example, may be defined using a data size of the first surrounding environment information 184, may be defined using the number of pieces of data of the first surrounding environment information 184, may be defined using the number of times recognition is performed using the first surrounding environment recognizing unit 132-1 (for example, 50 times or the like), or may be defined using a grid covering ratio in the case of conversion into a map grid of a point of interest using the first map information 54. The map updating unit 170 stores a surrounding recognition result including a traveling locus of the vehicle in the second driving state as the first surrounding environment information 184, and in a case in which a state in which a predetermined condition relating to the driving state is satisfied is resolved, sets a point of interest on the basis of the first surrounding environment information 184, and updates the intrinsic map information 182 corresponding to the point of interest. Points of interest include some points stored in the first surrounding environment information 184 among points for which information is not present (or information is old) in the second map information 62.

FIG. 6 is a diagram illustrating the first surrounding environment information 184 and the second surrounding environment information 186. When the second surrounding environment information 186 of a recognition result acquired by the second surrounding environment recognizing unit 132-2 relating to a point of interest is accumulated up to a second reference value or more, the map updating unit 170 updates additional information 184-1 as a part of the first surrounding environment information 184 on the basis of the accumulated second surrounding environment information 186. The effective period of the additional information 184-1 may be handed over from the second surrounding environment information 186, or an arbitrary effective period may be set at the time of updating the additional information 184-1.

The additional information 184-1, for example, includes closing information of lanes accompanying construction that has been performed over several years and the like. For example, when the construction ends, the first surrounding environment recognizing unit 132-1 recognizes lane information in a state in which the construction has ended. In such a case, since the lane information in the state in which the construction has ended is written over the first surrounding environment information 184, the additional information 184-1 that is information of long-term construction is deleted.

For the additional information 184-1, the second reference value of the second surrounding environment information 186 may be determined in accordance with attribute information of the original information (whether it is second layer information or third layer information). For example, in a case in which the original information is the third layer information, it can be regarded to be desirable that the original information be reflected in the additional information 184-1 in an earlier stage than in a case in which the original information is the second layer information. Thus, the second reference value of a case in which the original information is the third layer information may be determined to be set to a reference value smaller than the second reference value of a case in which the original information is the second layer information. In accordance with this, for example, when third layer information recognized during traveling toward a destination becomes the additional information 184-1, it can be referred to when a target locus of a return path is generated.

The map updating unit 170 may delete the additional information 184-1 of which the effective period has expired at a predetermined timing (in a predetermined period). At this time, the map updating unit 170 does not delete the first surrounding environment information 184 associated with the additional information 184-1 to be deleted.

[Driving State and Map Information]

FIG. 7 is a diagram illustrating driving states that can be executed by the vehicle control device 100 and map information. Inside an area for which the second map information 62 is present, the first driving state in which a monitoring obligation of the driver is low among driving supports of a plurality of types can be executed, and accordingly, the action plan generating unit 140 selects the first driving state (alternatively, the driver of the vehicle M is notified that the first driving state can be executed using the HMI 30 or the like, the driver is allowed to determine a type of driving support, and an input including a result of the determination is accepted). Even inside an area for which the second map information 62 is not present, in a case in which the intrinsic map information 182 is present, the first driving state can be executed, and thus the action plan generating unit 140 selects the first driving state. Even in a case in which the intrinsic map information 182 is not present, when a value indicating the degree of accumulation of the first surrounding environment information 184 is equal to or larger than the first reference value, the first driving state can be executed by causing the map updating unit 170 to generate or update the intrinsic map information 182 on the basis of the first surrounding environment information 184, and thus the action plan generating unit 140 selects the first driving state.

Inside an area for which the second map information 62 is not present, in a case in which the intrinsic map information 182 is not present and a case in which the first surrounding environment information 184 is smaller than the first reference value, the action plan generating unit 140 selects the second driving state.

[Switching of Driving Support]

Figure 8:
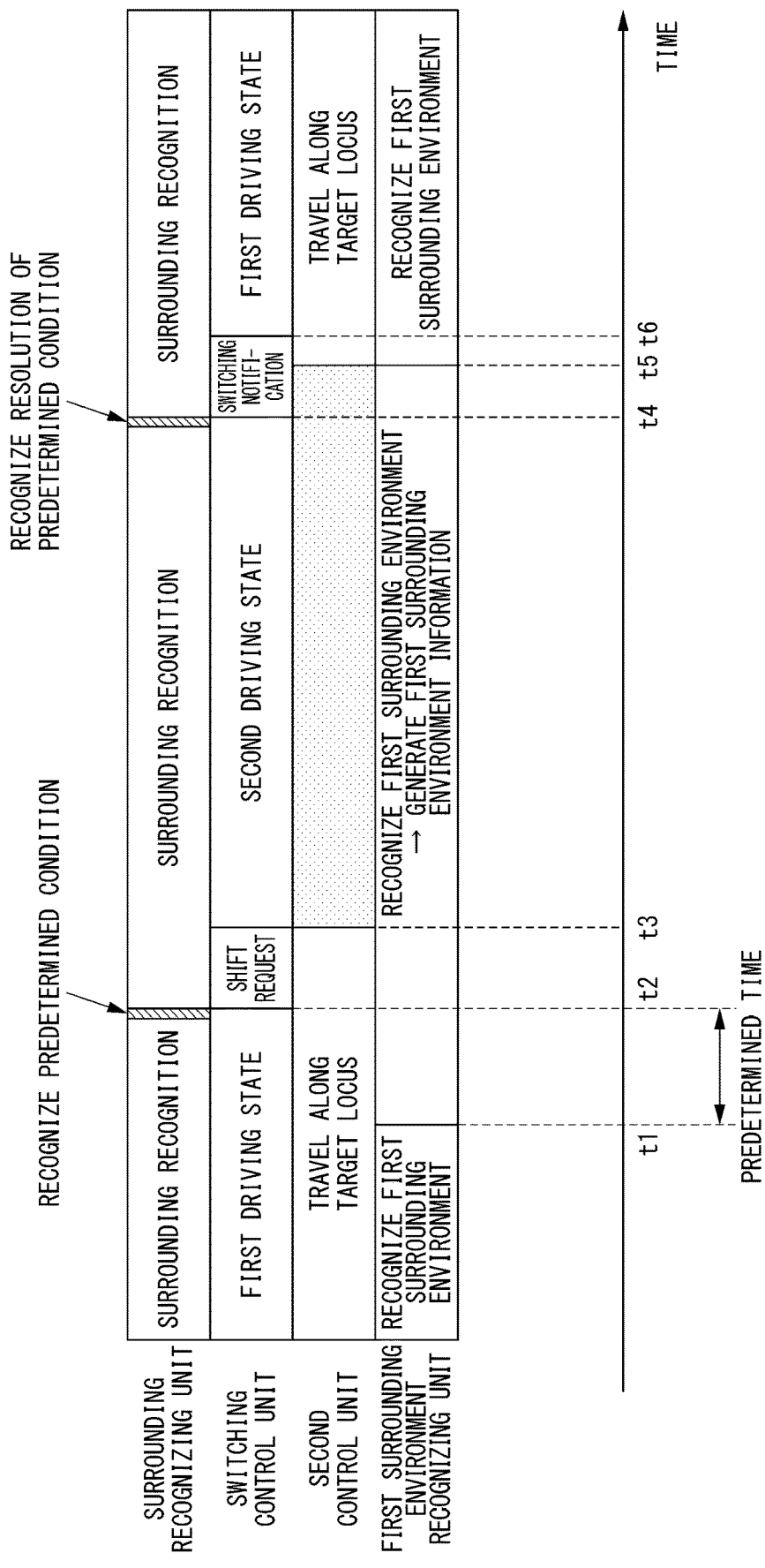
FIG. 8 is a diagram illustrating switching between driving states using a switching control unit.

FIG. 8 is a diagram illustrating switching between driving states using the switching control unit 142. In a case in which the action plan generating unit 140 of the vehicle M executes the first driving state, the second control unit 160 is assumed to travel on the basis of a target locus based on the second map information 62.

In the middle of execution of the first driving state, the surrounding recognizing unit 132 periodically determines whether or not a predetermined condition relating to driving support is recognized. The predetermined condition relating to driving support is a condition recognized to correspond to a situation that automated driving cannot easily handle in a situation in which flexible handling is required by switching to manual driving performed by the driver. The predetermined condition relating to driving support, for example, is a state in which a condition for generating a shift request is satisfied in accordance with an occurrence of a situation that is not assumed in automated driving using the second control unit 160 such as an occurrence of a deviation between the second map information 62 and a recognition result acquired by the surrounding recognizing unit 132, presence of an obstacle in a recommended lane for the vehicle M, and presence of a need to cause the vehicle to travel in accordance with an instruction from a traffic guide in accordance with construction or the like. The predetermined condition relating to driving support may be defined as "a traveling environment of the vehicle M not matching a precondition under which traveling can be performed in the first driving state." The predetermined condition relating to driving support may include approaching of an area where the second map information 62 and the intrinsic map information 182 are not present.

At a time t2, it is assumed that the surrounding recognizing unit 132 has recognized a surrounding status satisfying a predetermined condition relating to driving support. The switching control unit 142 determines switching to the second driving state and notifies the driver of the vehicle M of a shift request (a takeover request). In the shift request, for example, a notification of details of an obligation of the driver that occurs in accordance with the driving state changed from the first driving state to the second driving state is included. For example, in the shift request, moving of the subject of surrounding monitoring to the driver of the vehicle M and requesting of the driver to grip the driving operator 80 are included.

In a case in which it is recognized by an in-vehicle camera (not illustrated) that the driver has completed a shift in correspondence with a shift request or a case in which a predetermined time (for example, about 5 to 10 seconds) has elapsed after a notification, the switching control unit 142 switches the driving state to the second driving state. At a time t3, the driving state is assumed to be switched to the second driving state.

The first surrounding environment recognizing unit 132-1 generates or updates a recognition result after a time t1 that is a predetermined time before a time t2 at which a surrounding status satisfying a predetermined condition relating to driving support is recognized (in other words, a recognition result from the time t1 to the time t2 and includes temporary storage of a traveling locus of the vehicle M) as the first surrounding environment information 184. The first surrounding environment recognizing unit 132-1 generates or updates the first surrounding environment information 184 by outputting a recognition result until the end of the second driving state to the storage unit 180.

In this way, a surrounding status in which a predetermined condition is recognized can be reflected in the intrinsic map information 182 and the first surrounding environment information 184 such that the first driving state can be continued even in a case in which a surrounding status satisfying a predetermined condition relating to driving support is recognized.

In addition, the first surrounding environment recognizing unit 132-1 may generate or update the first surrounding environment information 184 on the basis of a recognition result during the execution of the second driving state after the time t2 illustrated in the drawing.

At a time t4, it is assumed that the surrounding recognizing unit 132 recognizes that the predetermined condition relating to driving support has been resolved. The switching control unit 142 notifies the driver of the vehicle M that it can be switched to the first driving state. In a case in which an input representing switching to the first driving state has been accepted by the driver of the vehicle M through the HMI 30 or the driving operator 80, the switching control unit 142 starts switching from the second driving state to the first driving state.

In a case in which the predetermined condition relating to driving support is the second map information 62 being absent, the switching control unit 142 selects the first driving state as a driving state in a case in which the vehicle M is traveling in the second driving state in which the driver has a higher degree of the monitoring obligation than in the first driving state in an area for which the second map information 62 is not present and approaches the inside of the area for which the second map information 62 is present, and it is predicted that a target locus based on the second map information 62 can be generated. In the case, the second control unit 160 notifies the driver that it can switch the driving state to the second driving state at the time t4.

After the target locus based on the intrinsic map information 182 is generated, the action plan generating unit 140 may generate a movement locus for moving the vehicle M to the target locus and cause the vehicle M to return to the target locus along the moving locus and travel. Hereinafter, a timing at which the second control unit 160 causes the vehicle M to start to travel along the target locus during the execution of the second driving state will be referred to as a time t5. The target locus based on the intrinsic map information 182 and the movement locus (an actual locus in a case in which the second driving state is manual driving and the target locus in a case in which the second driving state is automated driving) for moving the vehicle M to the target locus, which are generated by the action plan generating unit 140, are stored in the storage unit 180 in association with the first surrounding environment information 184 and the intrinsic map information 182.

When a predetermined time (for example, about 5 to 10 seconds) elapses after acceptance of an input indicating switching to the first driving state, the switching control unit 142 switches the driving state to the first driving state. It is assumed that switching to the first driving state is performed at a time t6.

In addition, the first surrounding environment recognizing unit 132-1 may generate or update the first surrounding environment information 184 on the basis of a recognition result during the execution of the second driving state until the time t5 illustrated in the drawing.

A recognition result before the time t1 and a recognition result after the time t5, which are acquired by the first surrounding environment recognizing unit 132-1, may or may not be reflected in the first surrounding environment information 184. A recognition result that is not reflected in the first surrounding environment information 184 among recognition results acquired by the first surrounding environment recognizing unit 132-1 may be deleted after a predetermined saving time. The predetermined saving time, for example, may be a time period that is the same as or longer than the predetermined time (in other words, from the time t1 to the time t2) described above.

[Processing Flow]

Figure 9:
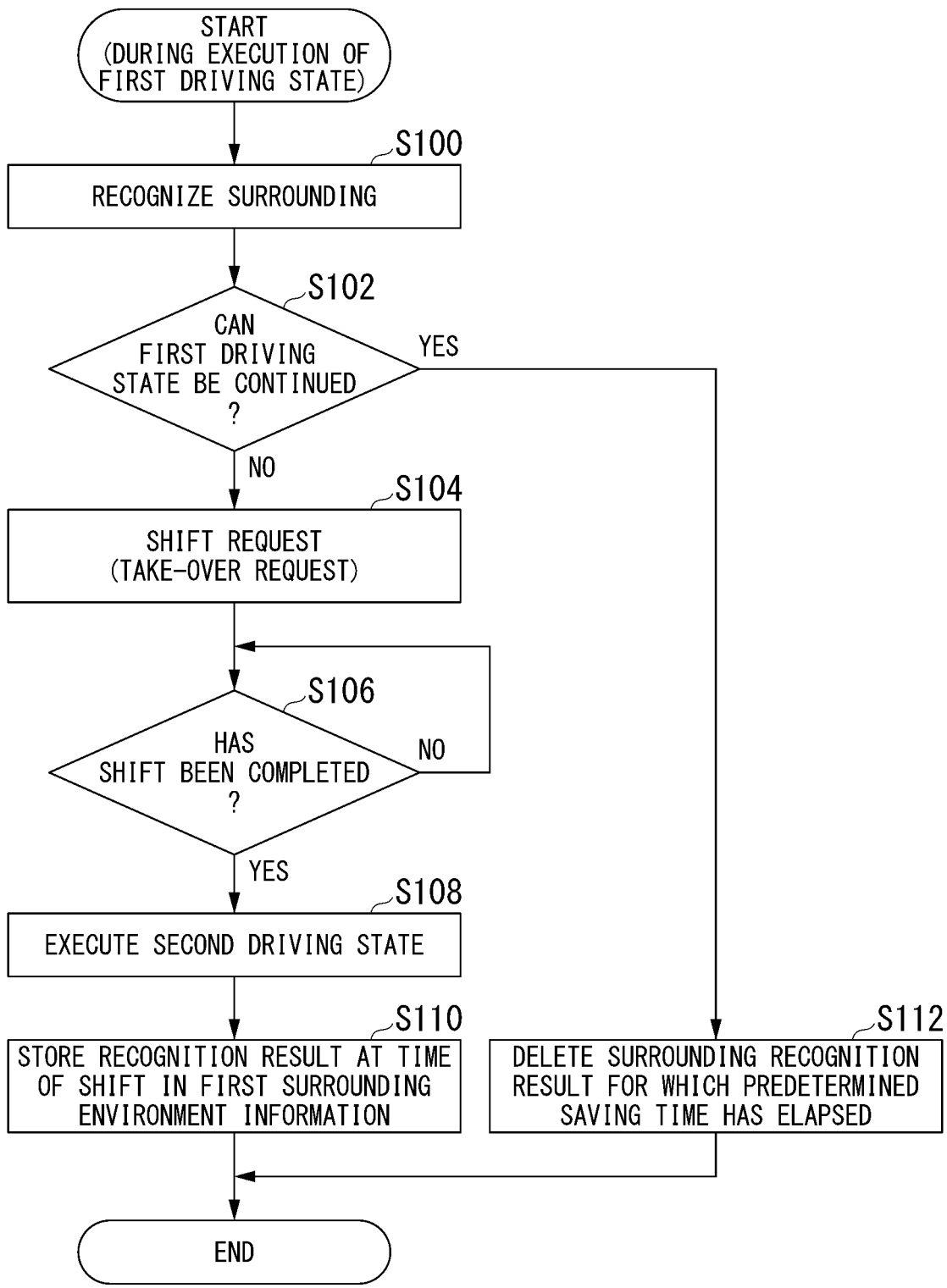
FIG. 9 is a flowchart illustrating an example of the flow of a process performed by a vehicle control device during execution of a first driving state.

FIG. 9 is a flowchart illustrating an example of the flow of a driving state switching process performed by the vehicle control device 100 during execution of the first driving state First, the surrounding recognizing unit 132 recognizes the surrounding environment of the vehicle M (Step S100). Next, the switching control unit 142 determines whether or not the first driving state can be continued (Step S102).

In a case in which it is not determined that the first driving state can be continued, the switching control unit 142 notifies of a shift request (take-over request) (Step S104). The switching control unit 142 determines whether or not a shift has been completed (Step S106). In a case in which it is not determined that a shift has been completed, the switching control unit 142 performs the process of Step S106 again after a predetermined time. In a case in which it is determined that a shift has been completed, the switching control unit 142 switches the driving state executed by the second control unit 160 to the second driving state (Step S108). Next, the first surrounding environment recognizing unit 132-1 stores recognition results from the generation of the shift request to the completion of switching to the second driving state in the first surrounding environment information 184 (Step S110), and the process of this flowchart ends.

In a case in which it is determined in Step S102 that the first driving state can be continued, the map updating unit 170 deletes surrounding recognition results for which a predetermined saving time has elapsed (step S112), and the process of this flowchart ends.

Figure 10:
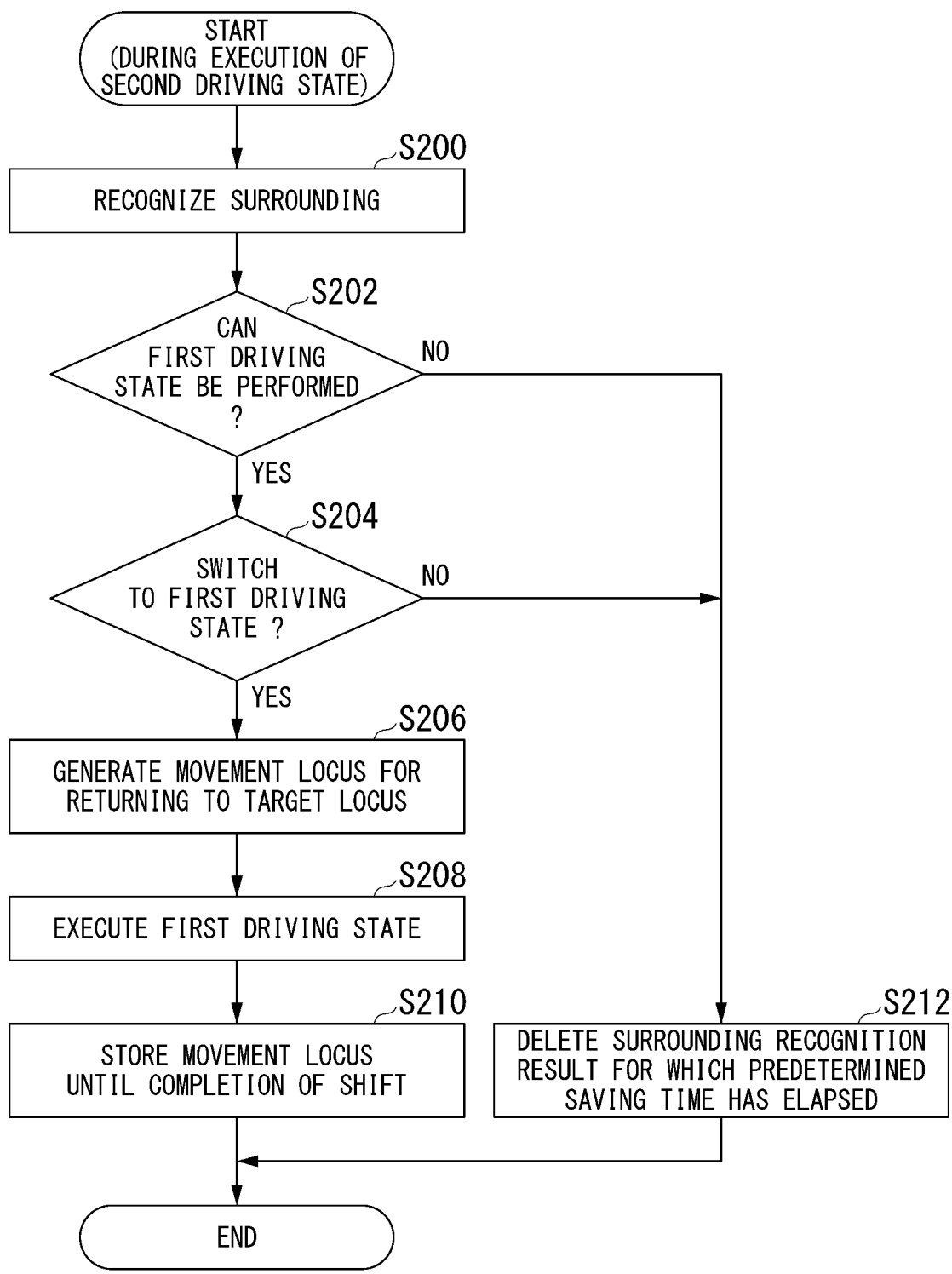
FIG. 10 is a flowchart illustrating an example of the flow of a process performed by a vehicle control device during execution of a second driving state.

FIG. 10 is a flowchart illustrating an example of the flow of a driving state switching process performed by the vehicle control device 100 during execution of the second driving state.

First, the surrounding recognizing unit 132 recognizes a surrounding status of the vehicle M (Step S200). Next, the switching control unit 142 determines whether or not the first driving state can be executed (Step S202).

In a case in which it is determined that the first driving state can be executed, the switching control unit 142 notifies the driver of the vehicle M that it can execute the first driving state and accepts an input relating to whether or not the driving state is changed (Step S204). In a case in which an input representing a change to the first driving state has been accepted, the action plan generating unit 140 generates a movement locus for returning to a target locus and causes the second control unit 160 to perform traveling control on the basis of the locus (Step S206), and upon returning to the target locus, executes the first driving state (Step S208). Next, the surrounding recognizing unit 132 (the first surrounding environment recognizing unit 132-1 and the second surrounding environment recognizing unit 132-2) stores recognition results until completion of a shift and the movement locus generated by the action plan generating unit 140 in the first surrounding environment information 184 or the intrinsic map information 182 (Step S210), and the process of this flowchart ends.

In a case in which it has not been determined that the first driving state can be executed in Step S202 or in a case in which an input of a change to the first driving state has not been accepted in Step S204, the map updating unit 170 deletes surrounding recognition results for which a predetermined saving time has elapsed (Step S212), and the process of this flowchart ends.

Figure 11:
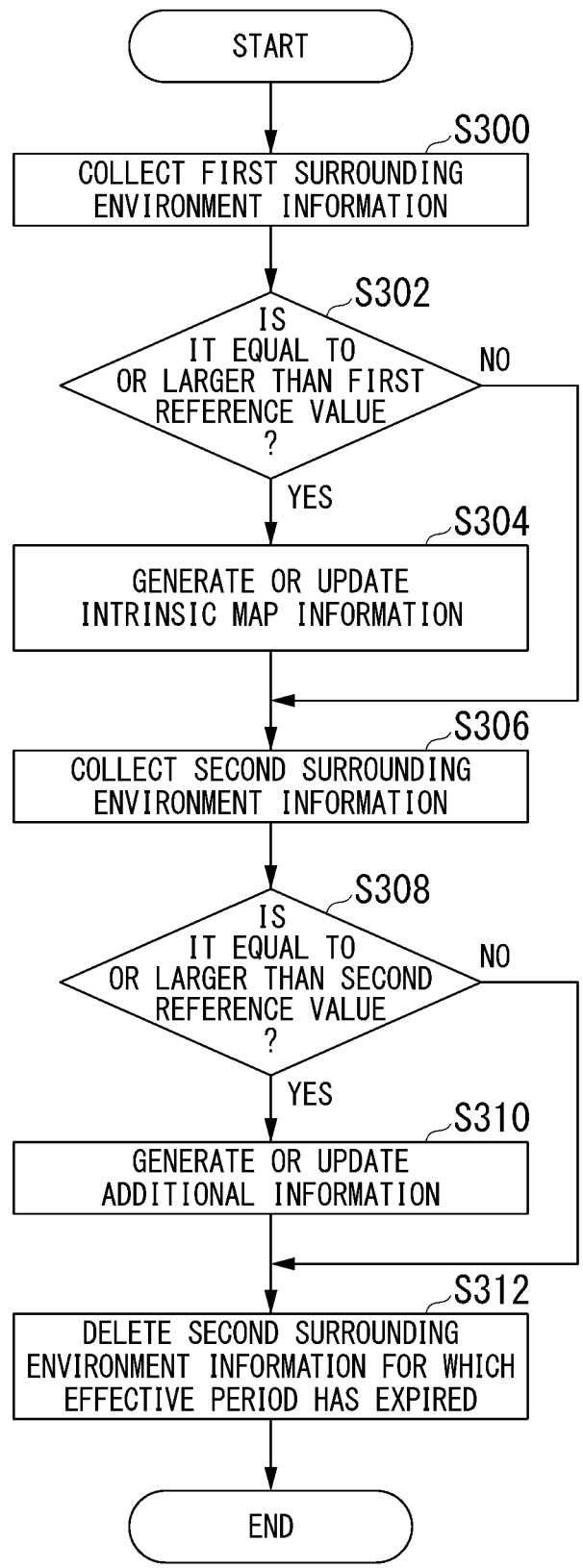
FIG. 11 is a flowchart illustrating an example of the flow of an information storing process performed by a map updating unit.

FIG. 11 is a flowchart illustrating an example of the flow of an information storing process performed by the map updating unit 170. The map updating unit 170 performs the process of the flowchart illustrated in FIG. 11 at a predetermined period or at a predetermined timing (for example, when an occupant exits the vehicle).

First, the map updating unit 170 collects the amount of accumulation of the first surrounding environment information 184 for each point of interest (Step S300). Next, the map updating unit 170 determines whether or not a value indicating a degree of accumulation of the first surrounding environment information 184 of a point of interest is equal to or larger than the first reference value (Step S302). In a case in which it is determined that the value described above is equal to or larger than the first reference value, the map updating unit 170 generates or updates the intrinsic map information 182 on the basis of the first surrounding environment information 184 of the point of interest (Step S304). On the other hand, in a case in which it is not determined that the value described above is equal to or larger than the first reference value, the process is caused to proceed to Step S306.

Next, the map updating unit 170 collects the amount of accumulation of the second surrounding environment information 186 for each point of interest (Step S306). Next, the map updating unit 170 determines whether or not a value indicating a degree of accumulation of the second surrounding environment information 186 of the point of interest is equal to or larger than the second reference value (Step S308). In a case in which it is determined that the value described above is equal to or larger than the second reference value, the map updating unit 170 generates or updates additional information 184-1 on the basis of the second surrounding environment information 186 of the point of interest (Step S310). On the other hand, in a case in which it is not determined that the value described above is equal to or larger than the second reference value, the process is caused to proceed to Step S312.

Next, the map updating unit 170 deletes the second surrounding environment information 186 for which the effective period has expired (Step S312), and the process of this flowchart ends.

As described above, according to the first embodiment, by generating the intrinsic map information 182 on the basis of recognition results acquired by the surrounding recognizing unit 132 of the vehicle M, map information that can be used for automated driving can be collected. According to the first embodiment, by generating a target locus on the basis of the intrinsic map information 182 even in the case of traveling inside an area for which the second map information 62 is not present, map information can be updated at a better update timing even inside the area for which the second map information 62 is not present, therefore traveling using the first driving state that is a more advanced driving state can be realized.

Second Embodiment

Hereinafter, a vehicle control device 100 according to a second embodiment will be described. Some or all of intrinsic map information 182, first surrounding environment information 184, and second surrounding environment information 186 of the vehicle control device 100 of a vehicle M according to the second embodiment are shared with other vehicles through a map information management system 5.

[Map Information Management System]

Figure 12:
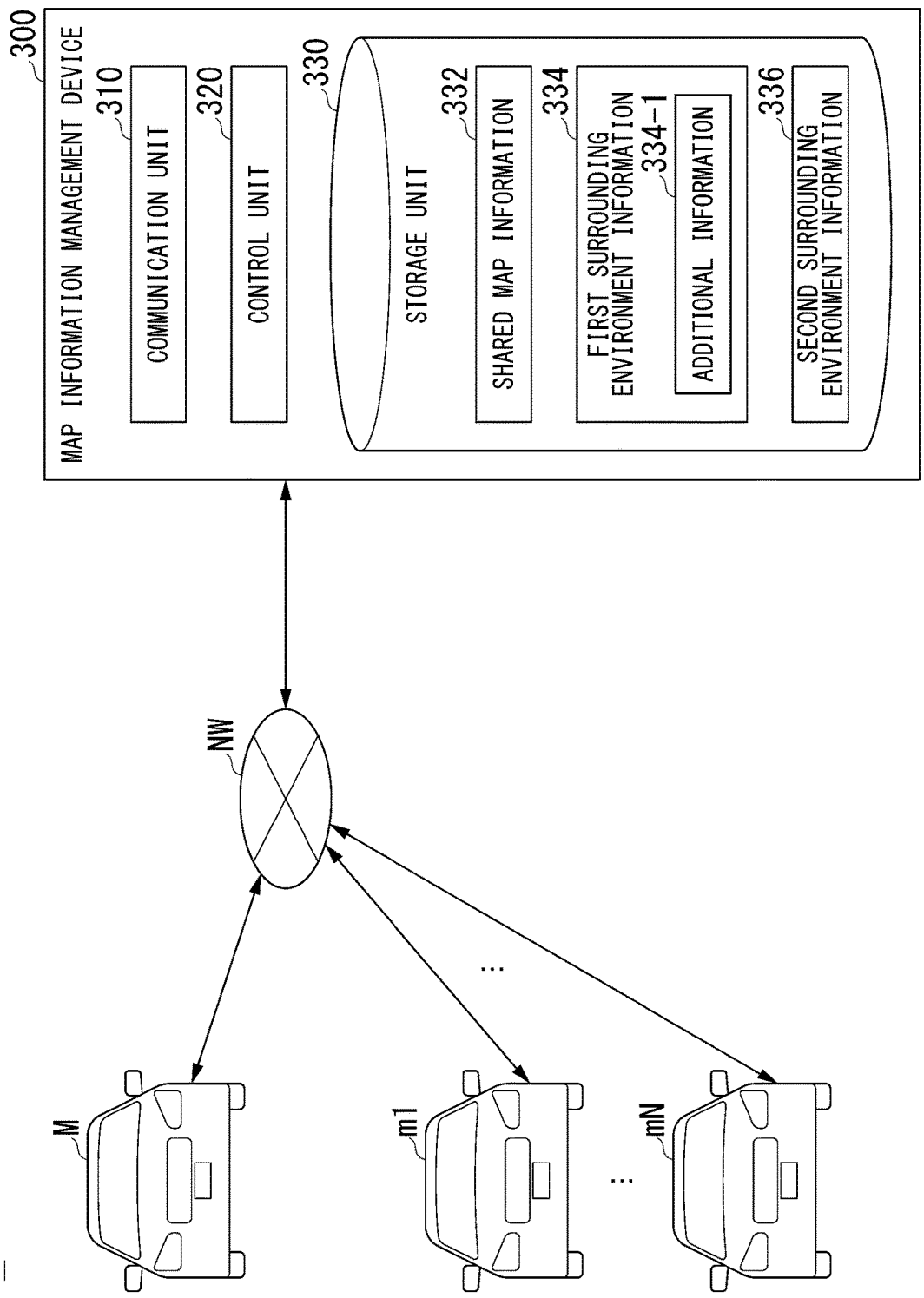
FIG. 12 is a diagram illustrating an example of the configuration of a map information management system.

FIG. 12 is a diagram illustrating an example of the configuration of the map information management system 5. The map information management system 5, for example, includes a vehicle, other vehicles m1 to mN (here, N is a natural number) including a vehicle system 1 or a vehicle control device 100, and a map information management device 300. Such devices and vehicles are interconnected using a multiplexing communication line such as a controller area network (CAN) communication line, a serial communication line, or a network NW such as a radio communication network. The configuration illustrated in FIG. 12 is merely an example, and a part of the configuration may be omitted or other configurations may be added.

The map information management system 5 is a system for the purpose of sharing the intrinsic map information 182, the first surrounding environment information 184, and the second surrounding environment information 186 that are accumulated in each of the vehicles including the vehicle M and the other vehicles m1 to mN.

The map information management device 300, for example, is a server apparatus that is managed by a manager of the second map information 62, a vehicle manufacturer, or the like. The map information management device 300, for example, includes a communication unit 310, a control unit 320, and a storage unit 330.

The storage unit 330, for example, is realized by an HDD, a flash memory, a RAM, or the like. For example, shared map information 332, first surrounding environment information 334, second surrounding environment information 336, and the like are stored in the storage unit 330. In the shared map information 332, information similar to the intrinsic map information 182 described above is stored. Information similar to the first surrounding environment information 184 and information similar to the second surrounding environment information 186 described above are respectively stored in the first surrounding environment information 334 and the second surrounding environment information 336. For example, additional information 334-1 corresponding to the additional information 184-1 is included in the first surrounding environment information 334. The storage unit 330 is one example of a "map sharing server."

The shared map information 332 is map information that includes information similar to the second map information 62. For example, preliminary information having an accuracy lower than that of the second map information 62 or the like is stored in the shared map information 332.

The communication unit 310 communicates with each vehicle through a network NW. The control unit 320 transmits information stored in the storage unit 330 to each vehicle through the communication unit 310. In addition, the control unit 320 stores information received from each vehicle through the communication unit 310 in the storage unit 330.

For example, in a case in which the second map information 62 and the intrinsic map information 182 of a point of interest are insufficient, the map updating unit 170 of the vehicle M inquires of the map information management device 300 about whether the shared map information 332 of the point of interest is present using the communication device 20. In a case in which the shared map information 332 of the point of interest is present, and a request for acquiring the shared map information 332 is accepted from the driver of the vehicle M, the control unit 320 delivers the shared map information 332 of the point of interest to the vehicle M. The shared map information 332 delivered by the map information management device 300, for example, is stored in the intrinsic map information 182.

The second control unit 160 of the vehicle M generates a target locus on the basis of the intrinsic map information 182 reflecting the shared map information 332 delivered from the map information management device 300.

In this way, even in a case in which the intrinsic map information 182 of a point of interest is not present, the vehicle M can execute the first driving state by obtaining map information based on the shared map information 332 of the point of interest from the map information management device 300 and complementing the intrinsic map information 182. In a case in which the intrinsic map information 182 of a point of interest is not present, and neither is the shared map information 332 of the point of interest present in the map information management device 300, the vehicle M may obtain information by requesting the other vehicles m1 to mN to disclose the intrinsic map information 182 of the point of interest.

The vehicle M may transmit some or all of the intrinsic map information 182, the first surrounding environment information 184, and the second surrounding environment information 186 to the map information management device 300.

For example, in a case in which a value indicating a degree of accumulation of the first surrounding environment information 184 of a point of interest becomes a third reference value, the map updating unit 170 of the vehicle M transmits the first surrounding environment information 184 of the point of interest to the map information management device 300. The third reference value may be the same as the first reference value described above or may be a different reference value from the first reference value (for example, in a case in which the first reference value is recognition results of the first surrounding environment recognizing unit 132-1 corresponding to 50 [times], the third reference value is recognition results of the first surrounding environment recognizing unit 132-1 corresponding to 70 [times] that is a value larger than the first reference value or the like).

In a case in which a value indicating a degree of accumulation of the second surrounding environment information 186 of a point of interest becomes a fourth reference value, the map updating unit 170 of the vehicle M transmits the second surrounding environment information 186 of the point of interest to the map information management device 300. The fourth reference value may be the same as the second reference value described above or may be an information quantity that is different from and is larger than the second reference value.

In a case in which the intrinsic map information 182 is generated or updated, the map updating unit 170 of the vehicle M transmits the intrinsic map information 182 that has been generated or updated to the map information management device 300.

The control unit 320 reflects the intrinsic map information 182 acquired from each vehicle in the shared map information 332. The control unit 320 reflects the first surrounding environment information 184 and the second surrounding environment information 186 acquired from each vehicle respectively in the first surrounding environment information 334 and the second surrounding environment information 336.

The control unit 320 may generate or update the shared map information 332 on the basis of the first surrounding environment information 334 at a predetermined period. The control unit 320 may generate or update the additional information of the first surrounding environment information 334 on the basis of the second surrounding environment information 336 at a predetermined period. The control unit 320, for example, similar to the map updating unit 170 according to the first embodiment, generates or updates the shared map information 332 on the basis of the first surrounding environment information 334 that is equal to or larger than the first reference value. The control unit 320, similar to the map updating unit 170, generates or updates the additional information 334-1 of the first surrounding environment information 334 on the basis of the second surrounding environment information 336 having the second reference value. Each of the first reference value and the second reference value used by the control unit 320 may be a threshold different from the threshold used by the map updating unit 170 according to the first embodiment.

The control unit 320 may delete the second surrounding environment information 336 for which an effective period has expired at a predetermined timing (a predetermined period). At this time, the control unit 320 does not delete the first surrounding environment information 334 associated with the deleted second surrounding environment information 336.

Figure 13:
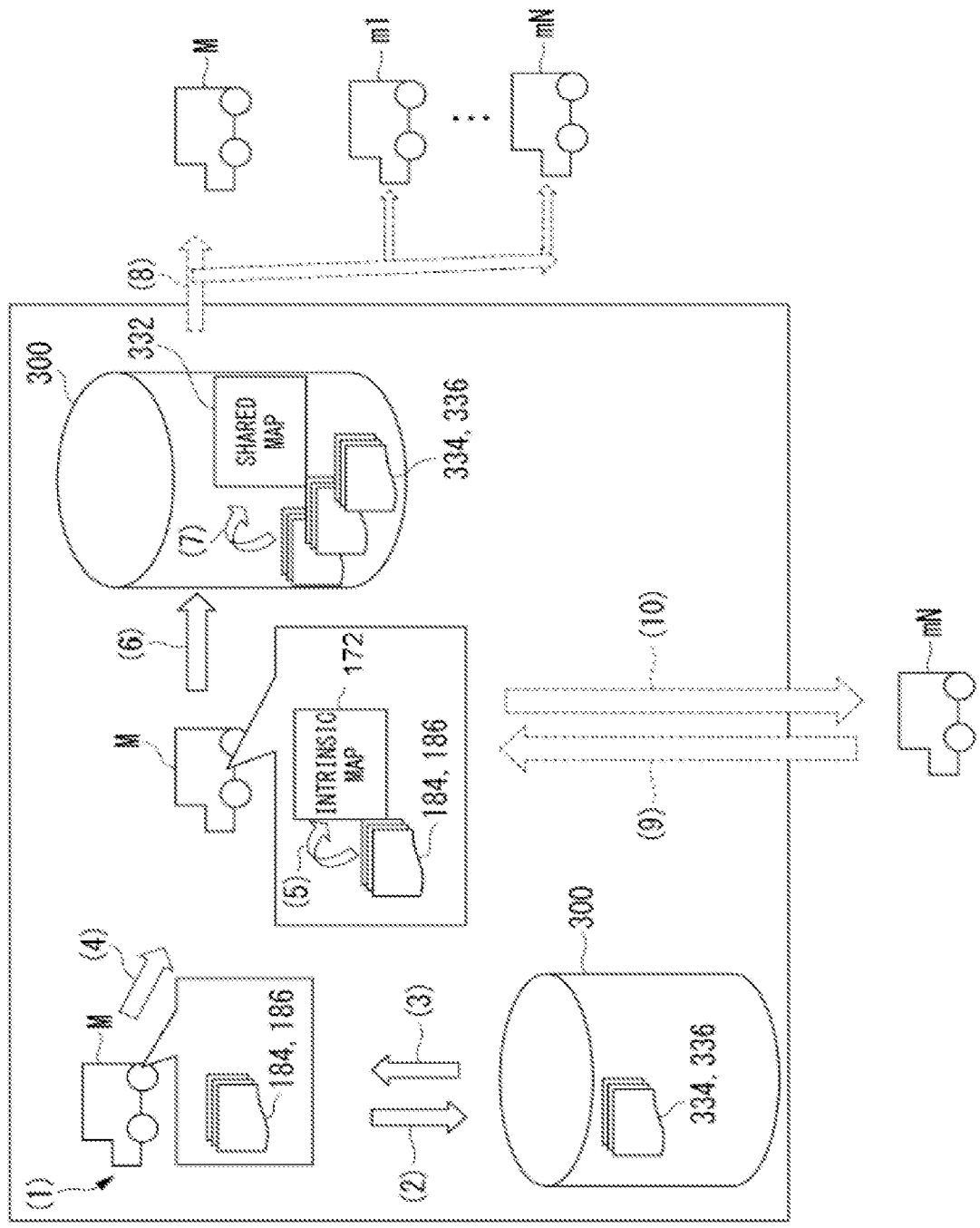
FIG. 13 is a diagram illustrating a process performed by a map information management system.

FIG. 13 is a diagram schematically illustrating a process performed by the map information management system 5. First, as illustrated in (1) in the drawing, the vehicle M accumulates the first surrounding environment information 184 and the second surrounding environment information 186 each time of traveling. When the first surrounding environment information 184 and the second surrounding environment information 186 that are accumulated become equal to or larger than the third reference value, as illustrated in (2) in the drawing, the first surrounding environment information 184 and the second surrounding environment information 186 are respectively stored as the first surrounding environment information 334 and second surrounding environment information 336 of the map information management device 300. The first surrounding environment information 334 accumulated in the map information management device 300 is shared with the vehicle M as necessary ((3) in the drawing).

When the vehicle M further repeats traveling ((4) in the drawing), and the first surrounding environment information 184 having the first predetermined value is accumulated, the map updating unit 170 generates an intrinsic map 172 ((5) in the drawing). This intrinsic map 172 may be transmitted to the map information management device 300 and be shared.

When the first surrounding environment information 184 is accumulated in accordance with the vehicle M further repeating traveling, and the first surrounding environment information 184 shared by the map information management device 300 reaches a sufficient quantity each time it becomes the third reference value, shared map information 332 is generated ((7) in the drawing).

In accordance with this, the shared map information 332 and the first surrounding environment information 334 accumulated in the map information management device 300 can be referred to from the vehicle M and the other vehicles m1 to mN.

The other vehicle nN not having map information of points included in the intrinsic map information 182 and the first surrounding environment information 184 owned by the vehicle M directly requests the communication device 20 of the vehicle M (or indirectly requests through the map information management device 300) to disclosure the intrinsic map information 182 and the first surrounding environment information 184 that are insufficient and obtains the intrinsic map information 182 and the first surrounding environment information 184 that are insufficient from the vehicle M.

[Processing Flow]

Figure 14:
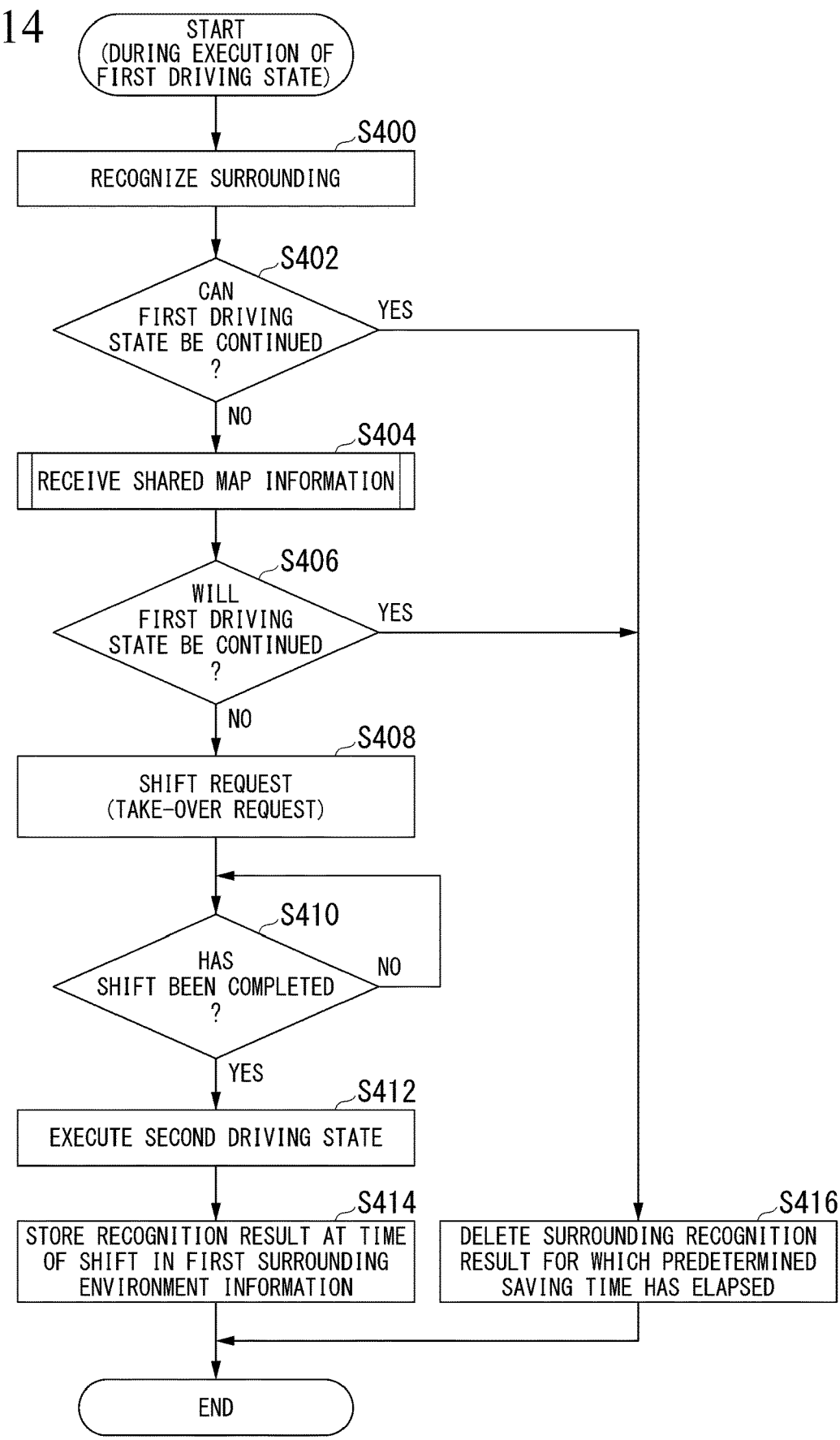
FIG. 14 is a flowchart illustrating an example of the flow of a driving state switching process performed by a vehicle control device according to a second embodiment.

FIG. 14 is a flowchart illustrating an example of the flow of a driving state switching process performed by the vehicle control device 100 according to the second embodiment. FIG. 14 illustrates an example of the flow of the driving state switching process performed by the vehicle control device 100 during execution of the first driving state.

First, the surrounding recognizing unit 132 recognizes a surrounding status of the vehicle M (Step S400). Next, the switching control unit 142 determines whether or not the first driving state can be continued (Step S402). Next, the map updating unit 170 receives the shared map information 332 from the map information management device 300 (Step S404). Details of the process of Step S404 will be described later.

Next, the switching control unit 142 notifies the driver of the vehicle M that the first driving state can be performed and accepts an input relating to whether or not the first driving support will be continued (Step S406). In a case in which it is not determined that an input indicating continuation of the first driving state has been accepted, the switching control unit 142 notifies of a shift request (a take-over request) (Step S408). The switching control unit 142 determines whether or not a shift has been completed (Step S410). In a case in which it is not determined that the shift has been completed, the switching control unit 142 performs the process of Step S410 again after a predetermined time elapses. On the other hand, in a case in which it is determined that the shift has been completed, the switching control unit 142 switches the driving state to be performed by the second control unit 160 to the second driving state (Step S412). Next, the first surrounding environment recognizing unit 132-1 stores recognition results from generation of the shift request to the completion of switching to the second driving state in the first surrounding environment information 184 (Step S414), and the process of this flowchart ends.

In a case in which it is determined that the first driving state can be continued in Step S402 or in a case in which it is determined that an input indicating continuation of the first driving state has been accepted in Step S406, the action plan generating unit 140 continues the first driving state and causes the map updating unit 170 to delete surrounding recognition results for which a predetermined saving time has elapsed (Step S416), and the process of this flowchart ends.

Figure 15:
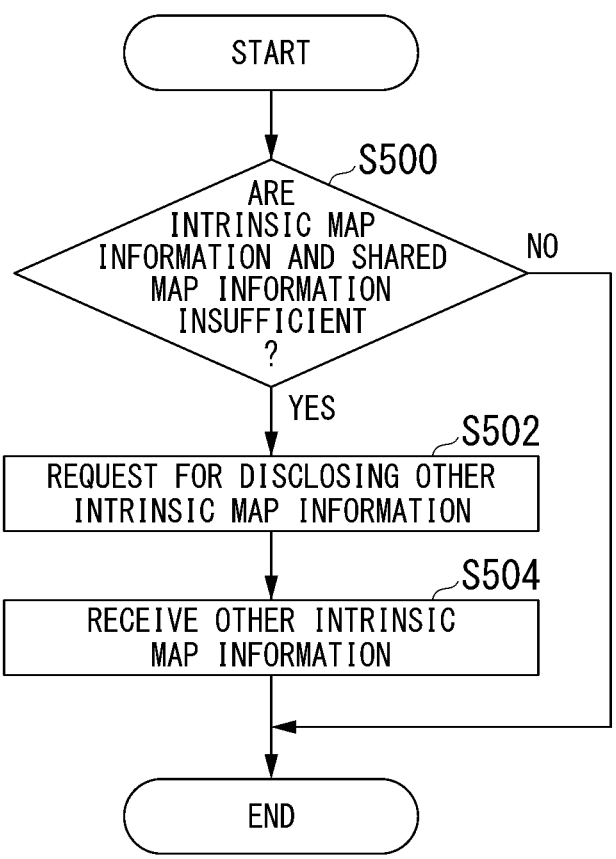
FIG. 15 is a flowchart illustrating an example of the flow of a shared map information acquiring process performed by a map updating unit.

FIG. 15 is a flowchart illustrating an example of the flow of the shared map information 332 acquiring process performed by the map updating unit 170. The flowchart illustrated in FIG. 15 is an example of the process of Step S404 illustrated in FIG. 14.

First, in a case in which the intrinsic map information 182 is not present, the map updating unit 170 inquires of the map information management device 300 about whether the shared map information 332 of a point of interest is present through the communication device 20 and determines whether or not the intrinsic map information 182 and the shared map information 332 are insufficient (Step S500). In a case in which it is determined that the intrinsic map information 182 and the shared map information 332 are not insufficient, the process of this flowchart ends. On the other hand, in a case in which it is determined that the intrinsic map information 182 and the shared map information 332 are insufficient, the communication device 20 requests the other vehicle nN (here, N is an arbitrary natural number) to disclose the intrinsic map information 182 of a target determined to be insufficient in Step S500 (Step S502). In Step S502, other specific other vehicle nM (for example, the other vehicle traveling near) may be directly requested to disclose the information, or a plurality of other vehicles may be requested to disclose the information through the map information management device 300.

After the process of Step S502, the map updating unit 170 receives the intrinsic map information 182 of the other vehicle nN (Step S504), and the process of this flowchart ends.

The process of the flowchart illustrated in FIG. 15 may be also performed when a destination is input before launching of the vehicle M, and a target locus is generated or the like.

Figure 16:
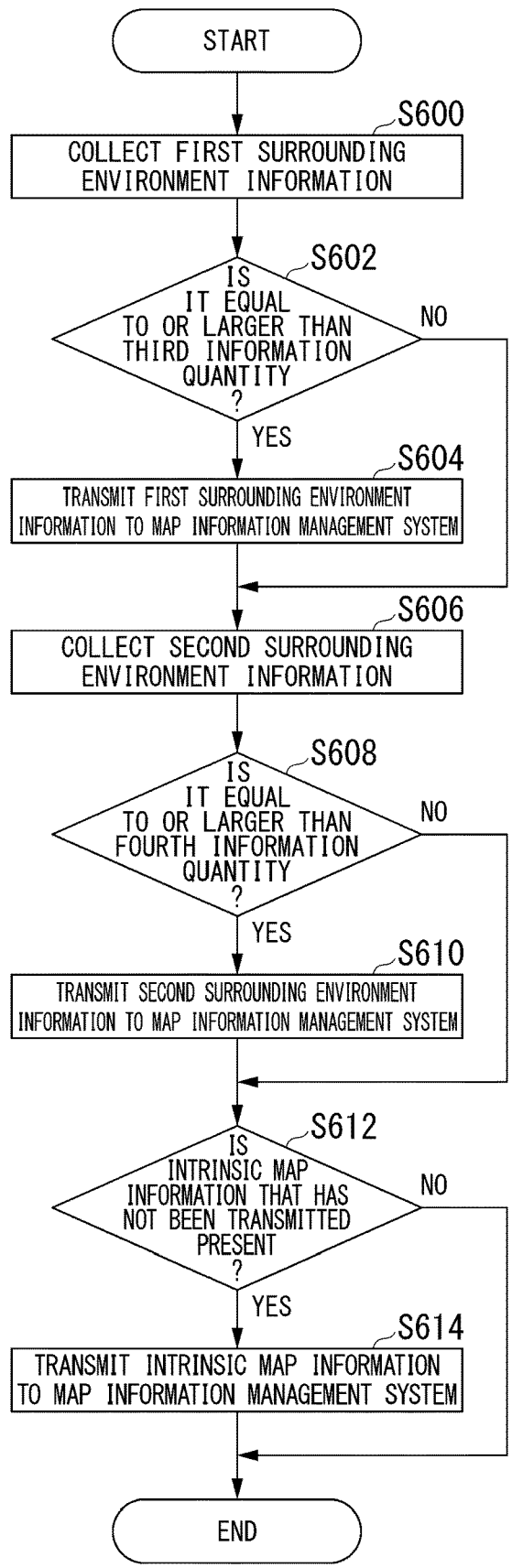
FIG. 16 is a flowchart illustrating an example of the flow of a process of transmitting information to a map information management device that is performed by a map updating unit.

FIG. 16 is a flowchart illustrating an example of the flow of a process of transmitting information to the map information management device 300 that is performed by the map updating unit 170. The map updating unit 170 performs the process of the flowchart illustrated in FIG. 16 at a predetermined period or at a predetermined timing (for example, at the time of a vehicle occupant getting out).

First, the map updating unit 170 collects the amount of accumulation of the first surrounding environment information 184 for each point of interest (Step S600). Next, the map updating unit 170 determines whether or not the first surrounding environment information 184 of a point of interest is equal to or larger than the third reference value (Step S602). In a case in which it is determined that the first surrounding environment information 184 is equal to or larger than the third reference value, the map updating unit 170 transmits the first surrounding environment information 184 to the map information management device 300 using the communication device 20 (Step S604). On the other hand, in a case in which it is not determined that the first surrounding environment information 184 is equal to or larger than the third reference value, the process is caused to proceed to Step S606.

Next, the map updating unit 170 collects the amount of accumulation of the second surrounding environment information 186 for each point of interest (Step S606). Next, the map updating unit 170 determines whether or not the second surrounding environment information 186 of the point of interest is equal to or larger than the fourth reference value (Step S608). In a case in which it is determined that the second surrounding environment information 186 of the point of interest is equal to or larger than the fourth reference value, the map updating unit 170 transmits the second surrounding environment information 186 to the map information management device 300 using the communication device 20 (Step S610). On the other hand, in a case in which it is not determined that the second surrounding environment information 186 of the point of interest is equal to or larger than the fourth reference value, the process is caused to proceed to Step S612.

Next, the map updating unit 170 determines whether or not the intrinsic map information 182 that has not been transmitted to the map information management device 300 (that has been generated or updated after previous transmission) is present (Step S612). In a case in which it is determined that the intrinsic map information 182 that has not been transmitted is present, the map updating unit 170 transmits the intrinsic map information 182 to the map information management device 300 (Step S614). On the other hand, in a case in which it is determined that the intrinsic map information 182 that has not been transmitted is present, the process of this flowchart ends.

Figure 17:
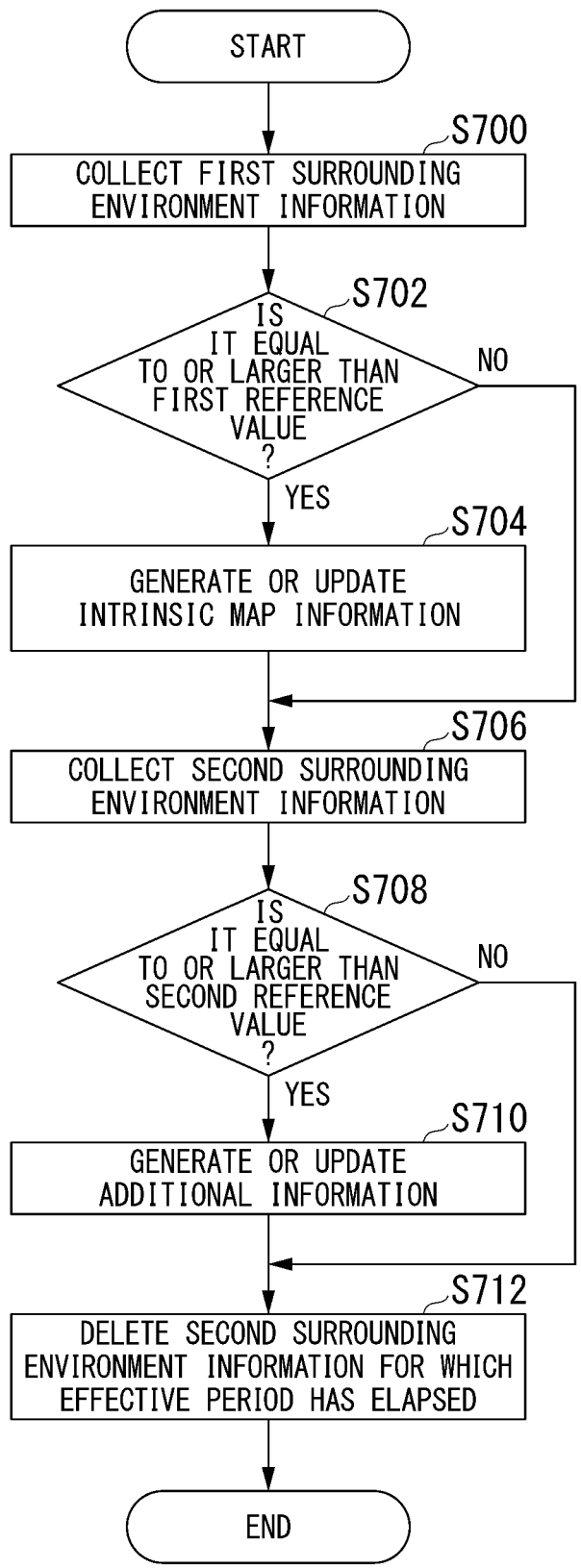
FIG. 17 is a flowchart illustrating an example of the flow of an information storing process performed by a control unit.

FIG. 17 is a flowchart illustrating an example of the flow of an information storing process performed by the control unit 320. The control unit 320 performs the process of the flowchart illustrated in FIG. 17 at a predetermined period.

First, the control unit 320 collects the amount of accumulation of the first surrounding environment information 334 for each point of interest (Step S700). Next, the control unit 320 determines whether or not a value indicating a degree of accumulation of the first surrounding environment information 334 of a point of interest is equal to or larger than the first reference value (Step S702). In a case in which it is determined that the value described above is equal to or larger than the first reference value, the control unit 320 generates or updates the shared map information 332 on the basis of the first surrounding environment information 334 of the point of interest (Step S704). On the other hand, in a case in which it is not determined that the value described above is equal to or larger than the first reference value, the process is caused to proceed to Step S706.

Next, the control unit 320 collects the amount of accumulation of the second surrounding environment information 336 for each point of interest (Step S706). Next, the control unit 320 determines whether or not the amount of accumulation of the second surrounding environment information 336 of the point of interest is equal to or larger than the second reference value (Step S708). In a case in which it is determined that the amount of accumulation of the second surrounding environment information 336 of the point of interest is equal to or larger than the second reference value, the control unit 320 generates or updates additional information 184-1 on the basis of the second surrounding environment information 336 of the point of interest (Step S710). On the other hand, in a case in which it is not determined that the amount of accumulation of the second surrounding environment information 336 of the point of interest is equal to or larger than the second reference value, the process is caused to proceed to Step S712.

Next, the control unit 320 deletes the second surrounding environment information 336 for which an effective period has expired (Step S712), and the process of this flowchart ends.

As described above, according to the map information management system 5 of the second embodiment, even in a case in which the intrinsic map information 182 of a point of interest is not present in the storage unit 180 of the vehicle M, in a case in which the shared map information 332 of the point of interest is present, the map information management device 300 delivers the shared map information 332 to the vehicle M, and accordingly, even inside an area for which the second map information 62 is not present, the vehicle M can realize traveling using the first driving state that is a more advanced driving state.

Modified Example

Figure 18:
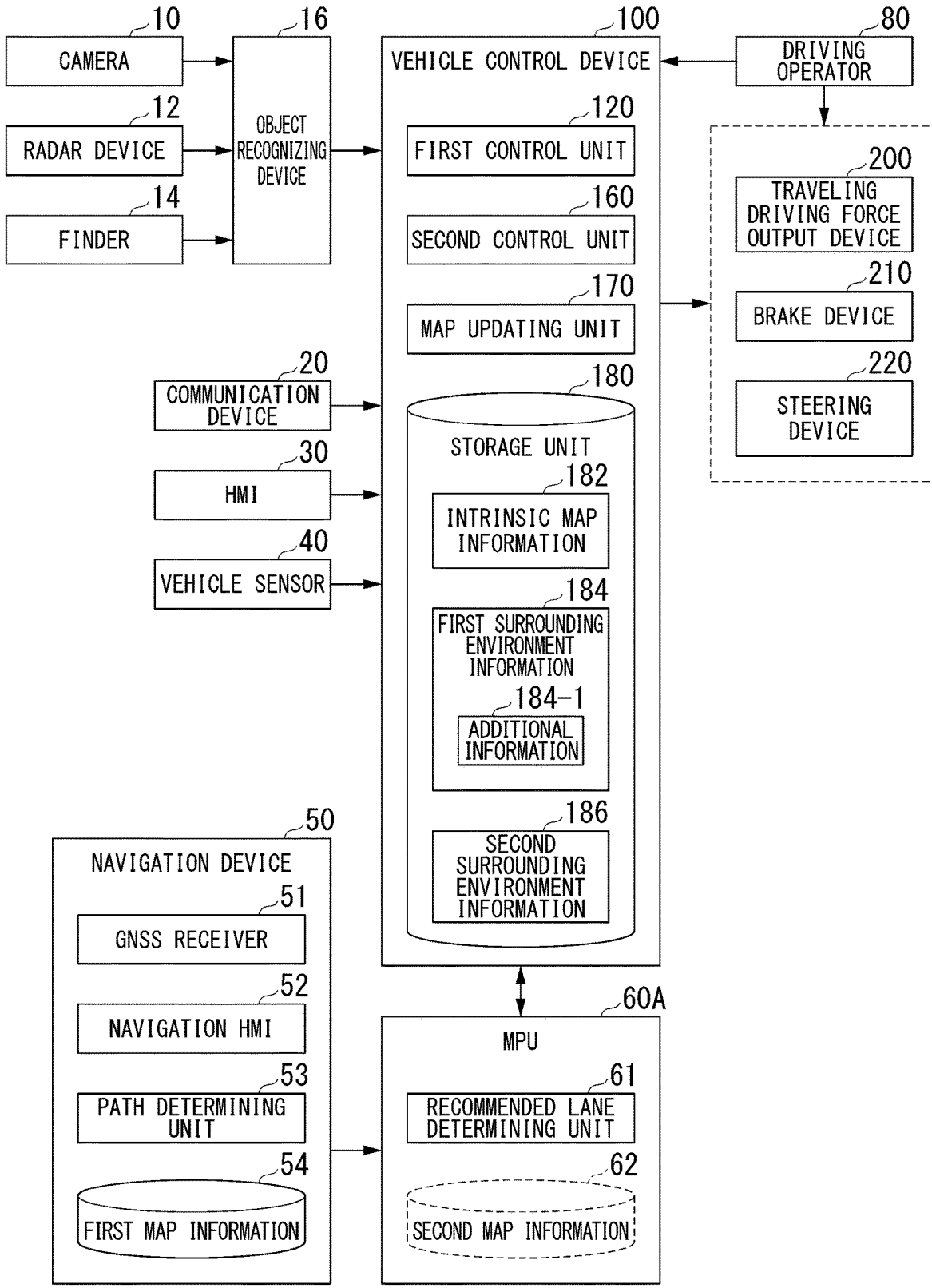
FIG. 18 is a configuration diagram of a vehicle system using a vehicle control device according to a modified example.

FIG. 18 is a configuration diagram of a vehicle system 1A according to a modified example. The vehicle system 1A is different from the vehicle system 1 illustrated in the embodiment described above in that the second map information 62 included in an MPU 60A is not updated, and map information of an area in which the vehicle M frequently travels is insufficient. In this case, the recommended lane determining unit 61 of the MPU 60A divides a path on the map provided from the navigation device 50 into a plurality of blocks and determines a recommended lane for each block by referring to the intrinsic map information 182 of the storage unit 180.

In a case in which the intrinsic map information 182 (including the shared map information 332 that has been downloaded) is insufficient for a point at which the vehicle M is present at an arbitrary timing such as a timing at which the navigation device 50 accepts an input of a destination at the time of fueling or charging the vehicle M, at the time of the driver of the vehicle M getting in or the like, the map updating unit 170 inquires about whether insufficient shared map information 332 is present in the map information management device 300. In a case in which a result of the inquiry indicating that the insufficient shared map information 332 is present is acquired, the map updating unit 170 inquires about whether or not the shared map information 332 is requested to be delivered at the time of the driver of the vehicle M getting in next time or the like.

For example, in a case in which a predetermined time (for example, about several years) has elapsed from a latest update of the second map information 62, and the reliability of the map information is assumed to be low, the recommended lane determining unit 61 of the MPU 60A determines a recommended lane for each block by referring to not the second map information 62 but the intrinsic map information 182.

In a case in which the shared map information 332 is requested to be delivered, the shared map information that is a delivery target may be configured to be able to be designated by a driver using a region such as "Kanto area", "Tokyo metropolitan area" and "23 Wards of Tokyo" such that unnecessary data is not accumulated in the intrinsic map information 182.

[Hardware Configuration]

Figure 19:
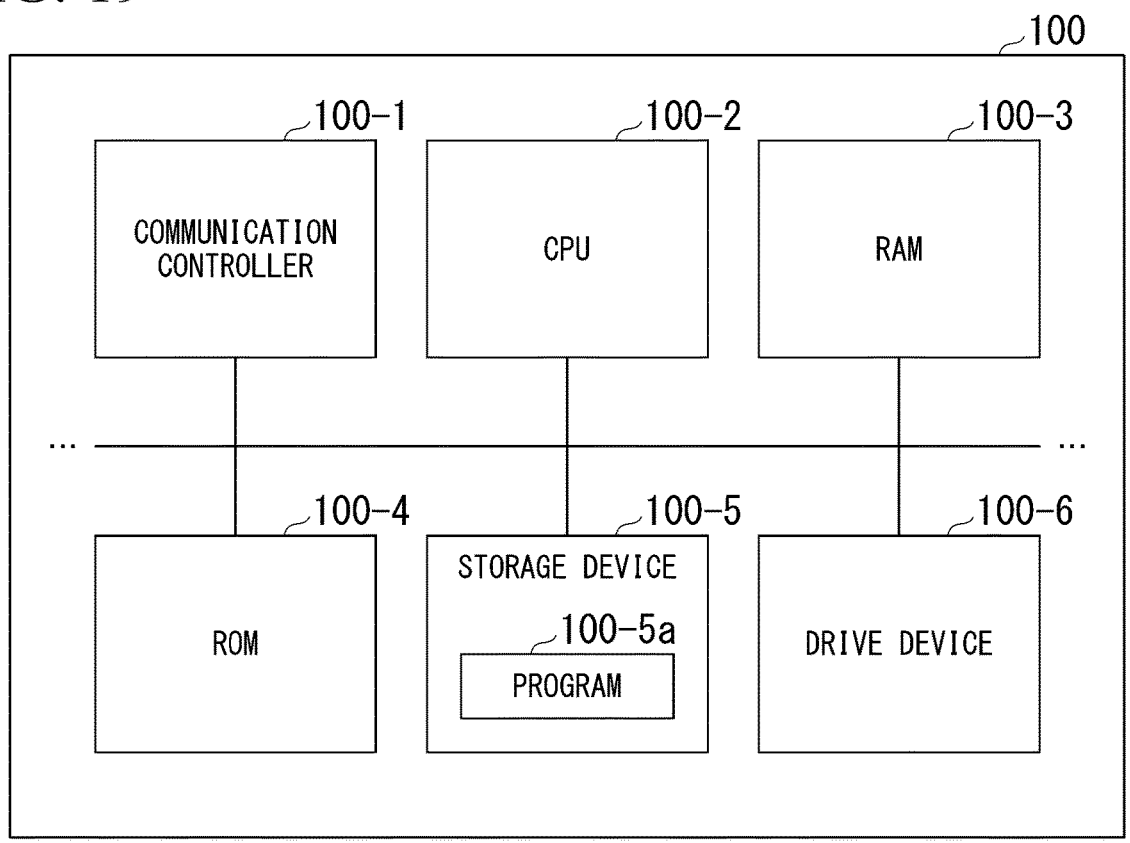
FIG. 19 is a diagram illustrating an example of the hardware configuration of various control devices according to embodiments.

FIG. 19 is a diagram illustrating one example of the hardware configuration of various control devices according to an embodiment. As illustrated in the drawing, the various control devices have a configuration in which a communication controller 100-1, a CPU 100-2, a RAM 100-3 used as a working memory, a ROM 100-4 storing a boot program and the like, a storage device 100-5 such as a flash memory or an HDD, a drive device 100-6, and the like are interconnected through an internal bus or a dedicated communication line. The communication controller 100-1 communicates with constituent elements other than the vehicle control device 100. A program 100-5a executed by the CPU 100-2 is stored in the storage device 100-5. This program is expanded into the RAM 100-3 by a direct memory access (DMA) controller (not illustrated in the drawing) or the like and is executed by the CPU 100-2. In this way, some or all of the first control unit 120, the second control unit 160, and the map updating unit 170 of the vehicle control device 100 and the map information management device 300 are realized.

The embodiment described above can be represented as below.

A vehicle control device including a storage device storing a program and a hardware processor and configured such that, by the hardware processor executing the program stored in the storage device, it recognizes a surrounding status of a vehicle, controls one or both of a speed and steering of the vehicle, switches to a second driving state in which the driver has a degree of a monitoring obligation higher than in a first driving state in a case in which the vehicle is caused to travel in the first driving state in which the driver has a low monitoring obligation among driving states of a plurality of types, and a recognition result satisfies a predetermined condition relating to the driving state described above, and updates intrinsic map information on the basis of a recognition result in a case in which switching from the first driving state to the second driving state is performed.

Although forms for performing the present invention have been described using the embodiments, the present invention is not limited to such embodiments at all, and various modifications and substitutions can be made without departing from the spirit or scope of the present invention.

What is claimed is:
1. A vehicle control device comprising:
a hardware processor executing software, hardware including circuitry, or a cooperation of the software and the hardware configured to operate as:
a recognition unit configured to recognize a surrounding status of a vehicle; and
a driving control unit configured to control one or both of a speed and steering of the vehicle,
wherein the driving control unit performs switching to a second driving state in which a driver has a higher degree of a monitoring obligation than in a first driving state in a case in which the vehicle is caused to travel in the first driving state in which the driver has a lower degree of the monitoring obligation among driving states of a plurality of types, and a recognition result acquired by the recognition unit satisfies a predetermined condition relating to the driving state, and
the vehicle control device further comprising a map updating unit configured to update intrinsic map information on the basis of the recognition result acquired by the recognition unit in a case in which switching from the first driving state to the second driving state is performed by the driving control unit,
the vehicle control device further comprise a communication unit configured to communicate with a map updating server updating a shared map on the basis of information acquired from the vehicle,
wherein the map updating unit transmits the recognition result acquired by the recognition unit at the time of switching from the first driving state to the second driving state using the driving control unit to the map updating server using the communication unit,
wherein the map updating unit stores a traveling locus of the vehicle in the second driving state in a memory, and in a case in which a state satisfying the predetermined condition relating to the driving state is resolved, sets a point of interest on the basis of the traveling locus of the vehicle stored in the memory and updates the intrinsic map information corresponding to the point of interest,
wherein first layer information and second layer information having a higher degree of change according to elapse of time than the first layer information are included in the intrinsic map information, wherein the recognition result acquired by the recognition unit relating to the point of interest is accumulated in the memory as the first layer information or the second layer information, and wherein the map updating unit
performs a process for updating the intrinsic map information corresponding to the point of interest on the basis of the first layer information relating to the point of interest in a case in which a value representing a degree of accumulation of the first layer information relating to the point of interest becomes equal to or larger than a first reference value, and performs a process of updating the intrinsic map information corresponding to the point of interest on the basis of the second layer information relating to the point of interest in a case in which a value representing a degree of accumulation of the second layer information relating to the point of interest becomes equal to or larger than a second reference value that is smaller than the first reference value.

2. The vehicle control device according to claim 1, wherein the map updating unit reflects the recognition result acquired by the recognition unit from a predetermined time before a time point at which switching from the first driving state to the second driving state is performed by the driving control unit in the intrinsic map information.

3. The vehicle control device according to claim 1, wherein the map updating unit deletes information of the second layer information for which a predetermined period has elapsed from a time point of assignment in the second layer information assigned to the intrinsic map information and does not delete the first layer information in accordance with the predetermined period.

4. The vehicle control device according to claim 1, wherein the recognition unit also assigns attribute information that can be used for identifying attributes of the second layer information to the intrinsic map information and determines the second reference value in accordance with the attribute information.

5. The vehicle control device according to claim 1,
wherein the map updating unit transmits the first layer information relating to the point of interest to the map updating server using the communication unit in a case in which a value representing a degree of accumulation of the first layer information relating to the point of interest becomes equal to or larger than a third reference value that is equal to or larger than the first reference value and transmits the second layer information relating to the point of interest to the map updating server using the communication unit in a case in which a value representing a degree of accumulation of the second layer information relating to the point of interest becomes equal to or larger than a fourth reference value that is equal to or larger than the second reference value.

6. The vehicle control device according to claim 5, wherein the map updating unit requests other vehicles having other intrinsic map information or the map updating server using the communication unit to disclose the other intrinsic map information corresponding to insufficient intrinsic map information in a case in which downloaded shared map information and the intrinsic map information are insufficient for a point at which the vehicle is present.

7. A vehicle control method comprising:
recognizing, by a computer comprising a processor, a surrounding status of a vehicle;
controlling, by the computer, one or both of a speed and steering of the vehicle;
performing, by the computer, switching to a second driving state in which a driver has a higher degree of a monitoring obligation than in a first driving state in a case in which the vehicle is caused to travel in the first driving state in which the driver has a lower degree of the monitoring obligation among driving states of a plurality of types, and a recognition result satisfies a predetermined condition relating to the driving state;
updating, by the computer, intrinsic map information on the basis of the recognition result in a case in which switching from the first driving state to the second driving state is performed;
communicating, by the computer, with a map updating server updating a shared map on the basis of information acquired from the vehicle;
transmitting, by the computer, the recognition result at the time of switching from the first driving state to the second driving state to the map updating server;
storing, by the computer, a traveling locus of the vehicle in the second driving state in a memory, and in a case in which a state satisfying the predetermined condition relating to the driving state is resolved, setting a point of interest on the basis of the traveling locus of the vehicle stored in the memory and updating the intrinsic map information corresponding to the point of interest,
wherein first layer information and second layer information having a higher degree of change according to elapse of time than the first layer information are included in the intrinsic map information;
wherein the recognition result relating to the point of interest is accumulated in the memory as the first layer information or the second layer information, and
wherein the method further comprises:
updating, by the computer, the intrinsic map information corresponding to the point of interest on the basis of the first layer information relating to the point of interest in a case in which a value representing a degree of accumulation of the first layer information relating to the point of interest becomes equal to or larger than a first reference value; and
updating, by the computer, the intrinsic map information corresponding to the point of interest on the basis of the second layer information relating to the point of interest in a case in which a value representing a degree of accumulation of the second layer information relating to the point of interest becomes equal to or larger than a second reference value that is smaller than the first reference value.

8. A computer-readable non-transitory storage medium storing a vehicle control program causing a computer comprising a processor to execute:
recognizing a surrounding status of a vehicle;
controlling one or both of a speed and steering of the vehicle;
performing switching to a second driving state in which a driver has a higher degree of a monitoring obligation than in a first driving state in a case in which the vehicle is caused to travel in the first driving state in which the driver has a lower degree of the monitoring obligation among driving states of a plurality of types, and a recognition result satisfies a predetermined condition relating to the driving state;

updating intrinsic map information on the basis of the recognition result in a case in which switching from the first driving state to the second driving state is performed;

communicating with a map updating server updating a shared map on the basis of information acquired from the vehicle;

transmitting the recognition result at the time of switching from the first driving state to the second driving state to the map updating server;

storing a traveling locus of the vehicle in the second driving state in a memory, and in a case in which a state satisfying the predetermined condition relating to the driving state is resolved, setting a point of interest on the basis of the traveling locus of the vehicle stored in the memory and updating the intrinsic map information corresponding to the point of interest, wherein first layer information and second layer information having a higher degree of change according to elapse of time than the first layer information are included in the intrinsic map information;

wherein the recognition result relating to the point of interest is accumulated in the memory as the first layer information or the second layer information, and wherein the computer comprising the processor further executes:

updating the intrinsic map information corresponding to the point of interest on the basis of the first layer information relating to the point of interest in a case in which a value representing a degree of accumulation of the first layer information relating to the point of interest becomes equal to or larger than a first reference value; and updating the intrinsic map information corresponding to the point of interest on the basis of the second layer information relating to the point of interest in a case in which a value representing a degree of accumulation of the second layer information relating to the point of interest becomes equal to or larger than a second reference value that is smaller than the first reference value.

* * * * *